(12) United States Patent
Barooah et al.

(10) Patent No.: US 10,230,240 B2
(45) Date of Patent: Mar. 12, 2019

(54) LOW-FREQUENCY ANCILLARY POWER GRID SERVICES

(71) Applicant: University of Florida Research Foundation, Incorporated, Gainesville, FL (US)

(72) Inventors: Prabir Barooah, Gainesville, FL (US); Sean Meyn, Gainesville, FL (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 97 days.

(21) Appl. No.: 15/031,509

(22) PCT Filed: Oct. 21, 2014

(86) PCT No.: PCT/US2014/061508
§ 371 (c)(1),
(2) Date: Apr. 22, 2016

(87) PCT Pub. No.: WO2015/061271
PCT Pub. Date: Apr. 30, 2015

(65) Prior Publication Data
US 2016/0261116 A1 Sep. 8, 2016

Related U.S. Application Data

(60) Provisional application No. 61/894,312, filed on Oct. 22, 2013.

(51) Int. Cl.
*H02J 3/28* (2006.01)
*G05B 15/02* (2006.01)
(Continued)

(52) U.S. Cl.
CPC .............. *H02J 3/28* (2013.01); *F24F 11/30* (2018.01); *F24F 11/62* (2018.01); *G05B 15/02* (2013.01);
(Continued)

(58) Field of Classification Search
CPC ...... G06Q 50/06; F24F 11/30; F24F 2110/10; F24F 11/62; F24F 11/00; F24F 11/70;
(Continued)

(56) References Cited

U.S. PATENT DOCUMENTS 4,205,381 A 5/1980 Games et al.
4,437,608 A 3/1984 Smith
(Continued)

FOREIGN PATENT DOCUMENTS

WO WO 2009/117695 A1 9/2009
WO WO 2017/004487 A1 1/2017

OTHER PUBLICATIONS

Callaway, Duncan S., Tapping the energy storage potential in electric loads to delivery load following and regulation, with application to wind energy, Mar. 6, 2009; Energy Conversion and Management, 50 (2009), 1389-1400.*
(Continued)

*Primary Examiner* — Jonathan Han
(74) *Attorney, Agent, or Firm* — Alston & Bird LLP

(57) ABSTRACT

Techniques for providing ancillary services to a power grid using customer premises such as commercial buildings. The techniques may involve receiving a regulation signal from a grid operator that is specific to a commercial building and modifying power consumption by at least one power consumption component in the building based on the regulation signal. The power consumption component may be a fan and/or a chiller of a Heating, Ventilation, and Air Conditioning (HVAC) system. The regulation signal may be
(Continued)

tracked in a at least a portion of a frequency band from about 4 seconds to about 60 minutes, and the control architecture may depend on the portion of the frequency band.

31 Claims, 18 Drawing Sheets

(51) Int. Cl.
   *G06Q 50/06* (2012.01)
   *F24F 11/30* (2018.01)
   *F24F 11/62* (2018.01)
   *H02J 3/14* (2006.01)
   *F24F 11/46* (2018.01)

(52) U.S. Cl.
   CPC ............. *G06Q 50/06* (2013.01); *F24F 11/46* (2018.01); *H02J 2003/143* (2013.01); *Y02B 70/3266* (2013.01); *Y02B 70/3275* (2013.01); *Y04S 20/242* (2013.01); *Y04S 20/244* (2013.01)

(58) Field of Classification Search
   CPC .... H02J 3/14; H02J 2003/143; H02J 13/0079; Y02B 70/3225
   USPC ............... 700/276, 295, 291, 282, 286, 297; 705/412; 236/49.3
   See application file for complete search history.

(56) References Cited

U.S. PATENT DOCUMENTS

| | | | |
|---|---|---|---|
| 5,598,349 | A | 1/1997 | Elliason et al. |
| 5,632,154 | A | 5/1997 | Sibik et al. |
| 6,227,961 | B1 | 5/2001 | Moore et al. |
| 6,349,883 | B1 | 2/2002 | Simmons et al. |
| 7,130,719 | B2 | 10/2006 | Ehlers et al. |
| 7,155,912 | B2 | 1/2007 | Enis et al. |
| 7,536,240 | B2 | 5/2009 | McIntyre et al. |
| 7,830,037 | B2 | 11/2010 | Hirst |
| 8,335,593 | B2 | 12/2012 | Johnson et al. |
| 8,376,242 | B1 | 2/2013 | Uselton |
| 8,428,785 | B2 | 4/2013 | Boucher et al. |
| 8,712,594 | B2 | 4/2014 | De Ridder |
| 9,366,451 | B2 | 6/2016 | Guo et al. |
| 2002/0190577 | A1 | 12/2002 | Jenni |
| 2003/0193244 | A1 | 10/2003 | Dodson, III |
| 2003/0223172 | A1 | 12/2003 | Priest |
| 2006/0116067 | A1 | 6/2006 | Federspiel |
| 2008/0082277 | A1 | 4/2008 | Holmquist et al. |
| 2008/0238208 | A1 | 10/2008 | Potter et al. |
| 2008/0277486 | A1 | 11/2008 | Seem et al. |
| 2011/0002241 | A1 | 1/2011 | Phan |
| 2012/0020831 | A1 | 1/2012 | Tanaka et al. |
| 2012/0041696 | A1 | 2/2012 | Sanderford, Jr. et al. |
| 2012/0072030 | A1 | 3/2012 | Elliott |
| 2012/0185728 | A1* | 7/2012 | Guo ............... F24F 11/0009 714/26 |
| 2012/0215368 | A1 | 8/2012 | Sharma |
| 2012/0217803 | A1 | 8/2012 | Talkin et al. |
| 2012/0232702 | A1 | 9/2012 | Vass et al. |
| 2012/0239205 | A1 | 9/2012 | Frerking |
| 2012/0259469 | A1 | 10/2012 | Ward et al. |
| 2012/0259471 | A1 | 10/2012 | De Ridder |
| 2012/0273980 | A1 | 11/2012 | Meirav |
| 2012/0296482 | A1 | 11/2012 | Steven et al. |
| 2012/0323637 | A1 | 12/2012 | Cushing et al. |
| 2013/0013121 | A1 | 1/2013 | Henze et al. |
| 2013/0038470 | A1 | 2/2013 | Niemeyer |
| 2013/0085616 | A1 | 4/2013 | Wenzel |
| 2013/0317959 | A1 | 11/2013 | Joos et al. |
| 2014/0039709 | A1 | 2/2014 | Steven et al. |
| 2014/0148953 | A1 | 5/2014 | Nwankpa et al. |
| 2014/0167513 | A1 | 6/2014 | Chang et al. |
| 2014/0277757 | A1 | 9/2014 | Wang et al. |
| 2014/0336840 | A1 | 11/2014 | Geinzer et al. |
| 2014/0339316 | A1 | 11/2014 | Barooah et al. |
| 2015/0027138 | A1 | 1/2015 | Schuster et al. |
| 2016/0161928 | A1 | 6/2016 | Bobker et al. |
| 2016/0261116 | A1 | 9/2016 | Barooah et al. |
| 2017/0030603 | A1 | 2/2017 | Barooah et al. |

OTHER PUBLICATIONS

Barooah et al., Spectral decomposition of demand-side flexibility for reliable ancillary services in a smart grid. Proceedings of the 48th Annual Hawaii International Conference on System Sciences (HICSS). Kauai, Hawaii. 2015;2700-9. 10 pages.

Bušić et al., Distributed randomized control for demand dispatch. arXiv:1603.05966v1. Mar. 18, 2016 18 pages.

Bušić et al., Ordinary Differential Equation Methods for Markov Decision Processes and Application to Kullback-Leibler Control Cost. arXiv:1605.04591. Oct. 22, 2016. 23 pages.

Bušić et al., Passive dynamics in mean field control. Proceedings of the 53rd IEEE Conference on Decision and Control. arXiv:1402.4618v2. Sep. 24, 2014;2716-21. 7 pages.

Chen et al., Ergodic theory for controlled Markov chains with stationary inputs. arXiv:1604.04013. Jun. 18, 2016. 26 pages.

Chen et al., Individual risk in mean field control with application to demand dispatch. Proceedings of the 53rd IEEE Conference on Decision and Control. arXiv:1409.6941. Sep. 24, 2014. 11 pages.

Chen et al., State estimation for the individual and the population in mean field control with application to demand dispatch. arXiv:1504.00088 . May 30, 2016. 12 pages.

Kwakernaak, Robust control and H∞ optimization tutorial paper. J Automatica. Mar. 1993;29(2):255-73.

Mathias et al., Demand dispatch with heterogeneous intelligent loads. Proceedings of the 50th Hawaii International Conference on System Sciences (HICSS). Jan. 2017;3138-47.

Mathias et al., Smart fridge / dumb grid? demand dispatch for the power grid of 2020. Proceedings of the 49th Annual Hawaii International Conference on System Sciences (HICSS). Online at arXiv:1509.01531. Jan. 2016;2498-507. 12 pages.

International Search Report and Written Opinion dated Jan. 21, 2015 for Application No. PCT/US2014/061508.

International Search Report and Written Opinion dated Mar. 16, 2015 for Application No. PCT/US2014/069772.

[No Author Listed], Agricultural demand response program in California helps farmers reduce peak electricity usage, operate more efficiently year-round. Case Study—M2M Smart Grid Investment Grant. 2012:1-3.

[No Author Listed], Annual Energy Review 2010. U.S. Energy Information Institute DOE/EIA-0384(2010). Oct. 19, 2011. 407 pages.

[No Author Listed], BPA Balancing Authority Load and Total Wind, Hydro, and Thermal Generation, Near-Real-Time. Bonneville Power Authority. http://transmission.bpa.gov/business/operations/Wind/baltwg.aspx [last accessed Jul. 26, 2016]. 2 pages.

[No Author Listed], Buildings Energy Data Book. 2011. United States Department of Energy. Mar. 2012. 285 pages.

[No Author Listed], First "Small Scale" Demand-side Projects in PJM Providing Frequency Regulation. PR Newswire. Nov. 21, 2011. http://www.prnewswire.com/news-releases/first-small-scale-demand-side-projects-in-pjm-providing-frequency-regulation-134253008.html [last accessed Jul. 26, 2016]. 3 pages.

[No Author Listed], Overview of commercial buildings, 2003 Technical report. Commercial Buildings Energy Consumption Survey: United States Department of Energy. 2008:1-20.

Nerc Resources Subcommittee, Balancing and frequency control. North American Electric Reliability Corporation. Technical Report. Jan. 26, 2011. 53 pages.

PJM, PJM Manual 12: Balancing Operations. Review 27. Dec. 20, 2012. 104 pages.

Agarwal et al., Duty-Cycling Buildings Aggressively: The Next Frontier in HVAC Control. Information Processing in Sensor Networks (IPSN). Apr. 2011;246-57. 12 pages.

(56) References Cited

OTHER PUBLICATIONS

Brambley et al., Advanced sensors and controls for building applications: Market assessment and potential R&D pathways. Pacific Northwest National Laboratory. Technical Report. PNNL-15149. Apr. 2005. 162 pages.
Braune et al., Whole building control system design and evaluation: simulation-based assessment. Cross-Task Team on Optimal Building Controls Design and Platform. 2012:1-128.
Braune, Reducing energy costs and peak electrical demand through optimal control of building thermal storage. ASHRAE. 1990;96:876-88.
Brooks et al., Demand Dispatch. IEEE Power and Energy Magazine. May 2010;8(3):20-9.
Callaway et al., Achieving controllability of electric loads. Proc IEEE. 2011; 99(1):184-99.
Callaway, Tapping the energy storage potential in electric loads to deliver load following and regulation, with application to wind energy. Energy Cony Manag. May 2009;50(5):1389-400.
Cheng et al., A robust control strategy for VAV AHU systems and its application. Adv Intel Soft Comp. 2012;133: 635-42.
Cho et al., Application of terminal box optimization of single-duct air-handling units. Int J Energy Res. Jan. 2010;34(1):54-66.
Christakou et al., GECN: Primary Voltage Control for Active Distribution Networks via Real-Time Demand-Tesponse. IEEE Trans Smart Grid. Mar. 2014;5(2):622-31. 10 pages.
Duarte et al., Prioritizing and visualizing energy management and control system data to provide actionable information for building operators. Western Energy Policy Research Conference. Aug. 25-26, 2011:1-14.
Elmahdy et al., A simple model for cooling and dehumidifying coils for use in calculating energy requirements for buildings. ASHRAE Trans. Jun. 1, 1977;83(2):103-17.
Erickson et al., Occupancy Based Demand Response HVAC Control Strategy. BuildSys. Nov. 2, 2010. 6 pages.
Escriva et al., Integral management system for the energy efficiency improvement in commercial facilities: application to the polytechnic University of Valencia. International Conference on Renewable Energy and Power Quality. Apr. 15-17, 2009:1-5.
Eyer et al., Energy storage for the electricity grid: Benefits and market potential assessment guide. Sandia National Laboratories Report, Study for the DOE Energy Storage Systems Program. 2010:1-232.
Goyal et al., A method for model-reduction of nonlinear building thermal dynamics of multi-zone buildings. Energy Bldg. 2012;47:332-40.
Goyal et al., Energy-efficient control of an air handling unit for a single-zone VAV system. 52nd IEEE Conference on Decision and Control. Mar. 11, 2013. 8 pages. doi: 10.1109/CDC.2013.6760641.
Goyal et al., Occupancy-Based Zone-Climate Control for Energy-Efficient Buildings: Complexity vs. Performance. Appl Energy. Jun. 2013;106(C):209-21.
Hao et al., Ancillary service for the grid via control of commercial building HVAC systems. American Control Conference. 2013:467-72.
Hao et al., Ancillary service to the grid through control of fans in commercial building HVAC systems. IEEE Trans Smart Grid. Jul. 2014;5(4):2066-74.
Hao et al., How demand response from commercial buildings will provide the regulation needs of the grid. 50th Annual Allerton Conference on Communication, Control, and Computing. Oct. 5, 2012;1908-13.
Hedrick, ASHRAE Standard 62.1-2010: Ventilation for Acceptable Indoor Air Quality. ASHRAE. Presentation. 2010. 68 pages.
Hirst et al., Electric power ancillary services. Technical report. Oak Ridge National Laboratory. 1996:1-54.
Huang et al., Dynamic simulation of energy management control functions for HVAC systems in buildings. Energy Conv Manag. May 2006;47(7-8):926-43.
Keeney et al., Applications of building precooling to reduce peak cooling requirements. ASHRAE Trans. 1997;103(1):463-9. 17 pages.
Kiliccote et al., Advanced controls and communications for demand response and energy efficiency in commercial buildings. Second Carnegie Mellon Conference in Electric Power Systems: Monitoring, Sensing, Software and Its Valuation for the Changing Electric Power Industry. Pittsburgh, PA. LBNL-59337. Jan. 2006. 11 pages.
Kirby, Frequency regulation basics and trends. US DoE. ORNL/TM-2004/291, Oak Ridge National Laboratory. Dec. 2004. 32 pages.
Koch et al., Modeling and control of aggregated heterogeneous thermostatically controlled loads for ancillary services. Proc Power Syst Comp Conf. Aug. 22-26, 2011:1-7.
Kundu et al., Modeling and control of thermostatically controlled loads. Proc $17^{th}$ Power Sys Comput Conf. 2011:1-12.
Lin et al., Commercial building HVAC system in power grid ancillary services. University of Florida. Technical Report. 2013. 7 pages.
Lin et al., Experimental evaluation of frequency regulation from commercial building HVAC systems. IEEE Trans Smart Grid. 2015;6(2):776-83.
Lin et al., Issues in identification of control-oriented thermal models of zones in multi-zone buildings. $51^{st}$ IEEE Conference on Decision and Control. Dec. 10-13, 2012:6932-7.
Lin et al., Low-Frequency Power-Grid Ancillary Services From Commercial Building HVAC Systems. IEEE Smart Grid Comm 2013 Symposium—Demand Side Management, Demand Response, Dynamic Pricing. 2013;169-74.
Makarov et al., Assessing the value of regulation resources based on their time response characteristics. Pacific Northwest National Laboratory. Technical Report. 2008:1-83.
Makarov et al., Operational impacts of wind generation on California power systems. IEEE Trans Power Sys. 2009; 24(2):1039-50.
Mathieu et al., State estimation and control of electric loads to manage real-time energy imbalance. IEEE Trans Power Systems. Feb. 2013;28(1);430-40.
Mathieu et al., State estimation and control of heterogeneous thermostatically controlled loads for load following. $45^{th}$ International Conference on System Sciences. 2012: 2002-11.
Mathieu, Modeling, analysis, and control of demand response resources. Dissertation. Ernest Orlando Lawrence Berkeley National Laboratory. University of California, Berkeley. May 2012. 182 pages.
Meyn et al., Ancillary Service to the Grid Using Intelligent Deferrable Loads. arXiv:1402.4600. Feb. 19, 2014. 30 pages.
Meyn et al., Markov Chains and Stochastic Stability. Cambridge Mathematical Library. Cambridge University Press, Cambridge. Sep. 2005. 567 pages.
Meyn et al., Randomized Policies for Demand Dispatch. SIAM Conference on Control & Its Applications. Maison de la Mutualité, Paris, France. Jul. 8-10, 2015. CT15 Abstracts. MS32. 103-4.
Meyn et al., Spectral Decomposition of Demand-Side Flexibility for Reliable Ancillary Services. International Conference on System Sciences. Kauai. Presentation. Jan. 5-8, 2015. 71 pages.
Meyn et al., The value of volatile resources in electricity markets. $49^{th}$ IEEE Conference on Decision and Control. Dec. 15-17, 2010: 1029-36.
Mossolly et al., Optimal control strategy for a multi-zone air conditioning system using a genetic algorithm. Energy. Jan. 2009;34(1):58-66.
Nassif et al., Optimization of HVAC control system strategy using two-objective genetic algorithm. HVAC&R Research. Jul. 2005;11(3):459-86.
Oldewurtel et al., Building control and storage management with dynamic tariffs for shaping demand response. $2^{nd}$ IEEE PES International Conference and Exhibition on Innovative Smart Grid Technologies. Dec. 5-7, 2011:1-8.
Pasupathy et al., Phase change material-based building architecture for thermal management in residential and commercial establishments. Renewable and Sustainable Energy Reviews. Jan. 2008; 12(1):39-64.
Rahman et al., Energy conservation measures in an institutional building in sub-tropical climate in Australia. Appl Energy. Oct. 2010;87:2994-3004.

(56) References Cited

OTHER PUBLICATIONS

Ruiz et al., A direct load control model for virtual power plant management. IEEE Transactions on Power Systems. May 2009;24(2):959-66.
Schweppe et al., Homeostatic Utility Control. IEEE Transactions on Power Apparatus and Systems. 1980;PAS-99(3):1151-63.
Široký T et al., Experimental analysis of model predictive control for an energy efficient building heating system. Appl Energy. Apr. 2011;88:3079-87.
Smith et al., Utility Wind Integration and Operating Impact State of the Art. IEEE Transactions on Power Systems. Aug. 2007;22(3):900-8.
Steffes, Grid-interactive renewable water heating: Analysis of the economic and environmental value. steffes.com/LiteratureRetrieve.aspx?ID=72241. [last accessed Jan. 15, 2015]. 16 pages.
Tashtoush et al., Dynamic model of an HVAC system for control analysis. Energy. Jul. 2005;30(10):1729-45.
Todd et al., Providing reliability services through demand response: A preliminary evaluation of the demand response capabilities of Alcoa Inc. Oak Ridge National Laboratory. ORNL/TM-2008/233. Jan. 2009:1-60.
Vu et al., Benefits of fast-response storage devices for system regulation in ISO markets. IEEE Power Energy Society General Meeting. 2009:1-8.
Wächter et al., On the implementation of an interior-point filter line-search algorithm for large-scale nonlinear programming. Math Prog Ser A. Apr. 28, 2005;106:25-57. 33 pages.
Wang et al., Model-based optimal control of VAV airconditioning system using genetic algorithm. Bldg Environ. Jan. 2000;35(6):471-87.
Watson et al., Strategies for demand response in commercial buildings. Proceedings of the 2006 ACEEE Summer Study on Energy Efficiency in Buildings. Pacific Grove, CA. Aug. 18-13, 2006. LBNL-60616. 14 pages.
Xu et al., Peak demand reduction from pre-cooling with zone temperature reset in an office building. ACEEE Summer Study on Energy Efficiency in Buildings. 2004:376-86.
Zhao et al., Evaluation of commercial building HVAC systems as frequency regulation providers. Energy Bldg. 2013;67:225-35.
ASHRAE, 2011 ASHRAE Handbook: HVAC applications. SI Edition. Oct. 17, 2011. 1104 pages.
Daikin Industries, "Daikin McQuay Tools Suite," www.daikinmcquay.com/McQuay/DesignSolutions/McQuayToolsEngineers, May 3, 2012 to Jun. 4, 2013, Internet Archive <https://web.archive.org/web/20120503101611/www.daikinmcquay.com/McQuay/DesignSolutions/McQuayToolsEngineers>, 5 pages.
Federal Energy Regulatory Commission, "Order No. 755 Frequency Regulation Compensation in the Wholesale Power Markets: Comments of ISO/RTO Council," May 2011.
Ogunnaike, B. A. et al., "Process dynamics, modeling, and control", Oxford University Press New York, 1994.
PCmag "control loop" <https://www.pcmag.com/encyclopedia/term/40309/control-loop> downloaded Apr. 16, 2018. (Year: 2018).
Rhodes, I. B., "A tutorial introduction to estimation and filtering", IEEE Transaction on Automatic Control, vol. AC-16, No. 6, 1971.
Weather Underground, www.underground.com, Nov. 21, 1996 to Jul. 24, 2018, Internet Archive <https://web.archive.org/web/*/https://www.wunderground.com/>, 7 pages.
Wikipedia, "Control loop" <https://en.wikipedia.org/wiki/Control_loop> downloaded Apr. 16, 2018. (Year: 2018).
Yao, Y., et al., "Thermal analysis of cooling coils based on a dynamic model", Applied thermal engineering, vol. 24, No. 7, pp. 1037-1050, 2004.
Zhou, X. et al., "A simplified dynamic model for chilled-water cooling and dehumidifying coils Part 1: Development (RP-1194)", HVAC&R Research, vol. 13, No. pp. 785-804, 2007.
U.S. Appl. No. 14/120,367, filed May 14, 2014, Barooah et al.
U.S. Appl. No. 15/102,895, filed Jun. 9, 2016, Barooah et al.
PCT/US2014/061508, Jan. 21, 2015, International Search Report and Written Opinion.
PCT/US2014/069772, Mar. 16, 2015, International Search Report and Written Opinion.

* cited by examiner

LOW-FREQUENCY ANCILLARY POWER GRID SERVICES

RELATED APPLICATIONS

The present application is a U.S. national stage filing under 35 U.S.C.§ 371 based on International Application No. PCT/US2014/061508 entitled "LOW FREQUENCY ANCILLARY POWER GRID SERVICES", filed Oct. 21, 2014, which claims priority under 35 U.S.C. § 119 to U.S. Provisional Application Serial No. 61/894,312, filed Oct 22, 2013, each of which is incorporated by reference herein in its entirety.

GOVERNMENT SUPPORT

This invention was made with U.S. government support under Grant Numbers CNS-0931885and ECCS-0925534, awarded by The National Science Foundation. The government has certain rights in the invention.

BACKGROUND

The proper functioning of a power grid requires continuous matching of supply and demand in the grid, in spite of the randomness of electric loads and the uncertainty of generation. A direct consequence of a supply-demand mismatch is a deviation in the system frequency. Since large frequency deviations can compromise the stability of the power grid, various "ancillary services" are used to compensate for the supply-demand imbalance. For example, ancillary services such as regulation and load following may be used to manage the supply-demand balance.

SUMMARY

Some embodiments of the invention provide a framework to utilize a customer premises, such as a commercial building, to provide ancillary services to a power grid. Due to their large thermal capacity, commercial buildings may provide effective ancillary service to the power grid, without noticeably impacting the building's indoor environment (e.g., temperature). One or more power consumption components in a commercial building, such as, for example, fans and/or chillers, may provide a large fraction of the current regulation requirements of the U.S. national grid without requiring additional investment and equipment. Control architectures are proposed to provide the ancillary service that modulates operation of HVAC components in a building.

In some aspects, an architecture may provide for ancillary services in response to low-frequency variations in a regulation signal. Such an architecture may be based on modulating a control signal to a component of an HVAC system. In some embodiments, the control signal that is modulated may control a flow rate through a fan of the HVAC system. A value for the modulated control signal may be computed with one or more predictors, each of which computationally predicts a value of a signal at a future time. A predictor may predict the regulation signal at a future time. Alternatively or additionally, a predictor may predict power consumption of the HVAC system at a future time. These predictors may be used alone or together as part of a calculation to provide a stable architecture in which fan speed, or other operating parameter of the HVAC system, is adjusted at a present time so that the predicted power consumption at a future time is proportional to the predicted regulation signal at that time.

Control architectures to provide low-frequency ancillary services may be used alone or in combination with control architectures that provide ancillary services in other frequency ranges and or based on other characteristics of the regulation signal. In some embodiments, at least one component of an HVAC may be selected based on a frequency of a regulation signal. The selected components may have an operating parameter modulated based on the regulation signal. Alternatively or additionally, the at least one component to be modulated may be selected based on other characteristics of the regulation signal, such as its magnitude.

Accordingly, the invention may be embodied as a method of providing ancillary services to a power grid using a customer premises comprising at least one power consumption component. In some embodiments, the method may comprise receiving a regulation signal, and, based on the received regulation signal, modifying at least one operating parameter of the at least one power consumption component so that a projected power consumption by the at least one power consumption component is changed in accordance with a projection of the received regulation signal. The regulation signal may be associated with an ancillary service for the power grid and may indicate a change in power consumption at the customer premises to implement the ancillary service.

In other embodiments, the method may comprise receiving a regulation signal, determining primary frequency components of the regulation signal, and based on the primary frequency components, selecting at least one operating parameter of the at least one power consumption component and adjusting the at least one selected operating parameter so that power consumption by the at least one power consumption component is changed in accordance with the received regulation signal. The regulation signal may have primary frequency components indicative of variations in power consumption over a time ranging from 4 seconds to 120 minutes.

The invention may also be embodied as a method for operating a power grid. In some embodiments, the method may comprise determining an amount of load to be adjusted in the power grid, allocating to each facility of a plurality of facilities an adjustment in power consumption to achieve a load adjustment based on the determined amount, and transmitting a plurality of regulation signals to the plurality of facilities. Each regulation signal of the plurality of regulation signals transmitted to the facility may indicate the adjustment in power consumption allocated to the facility.

The invention may also be embodied as an apparatus for controlling a power consumption component to provide an ancillary service to a power grid. In some embodiments, the apparatus may comprise circuitry configured to receive a regulation signal associated with the ancillary service for the power grid, receive input indicating at least one operating parameter of at least one power consumption component, and generate a control signal for the at least one power consumption component such that the at least one operating parameter of the at least one power consumption component is changed in accordance with the input and the received regulation signal to control power consumption of the at least one power consumption component in accordance with the ancillary service.

The foregoing is a non-limiting summary of the invention, which is defined by the attached claims.

DETAILED DESCRIPTION

Figure 1:
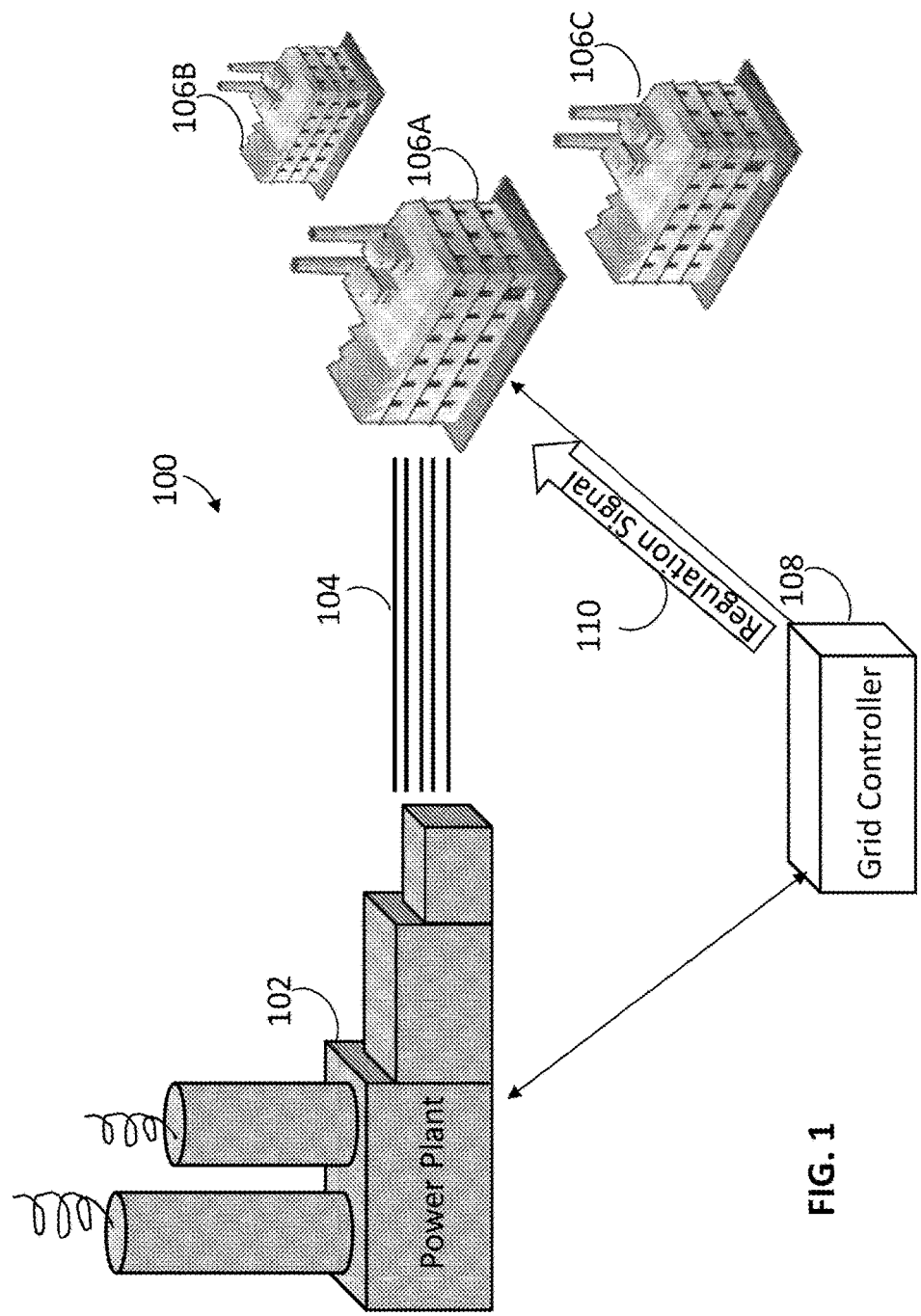
FIG. 1 is a schematic diagram of a power grid system in which some embodiments may be implemented.

In an electrical power grid, power generation and transmission are continuously adjusted to compensate for a supply-demand imbalance due to fluctuating customer load. To maintain the balance of the supply and demand, ancillary regulation services support a reliable operation of the grid as it moves electricity from generating sources to customers. Typical ancillary services procured by power grid operators involve maintaining or restoring the power balance in the system over different time frames [15]. A frequency regulation service deployed to correct short-term fluctuations in load and generation is typically provided by generators which are ramped up and down to track a regulation signal sent by the grid operator that dictates changes in the generators' output.

Increased reliance on renewable generation introduces greater volatility and uncertainty in dynamics of a power grid and imposes additional regulation requirements on the grid [18, 19, 24]. The regulation requirements can be lowered if faster responding resources are available [17, 20]. These factors coupled with the search for cleaner sources of flexibility as well as regulatory developments, such as Federal Energy Regulatory Commission (FERC) order 755, have garnered a growing interest in tapping the fast response potential of storage and demand-side resources. In the absence of utility-scale storage alternatives, loads with virtual storage capabilities, such as heating and cooling loads, water pumps and refrigerators are becoming popular choices to fulfill ancillary service requirements of the grid [21, 26]. Additionally, manufacturing companies and agriculture farms have been engaged by ramping up and down their energy use in response to the requirements of the grid [2, 12].

The flexibility potential of demand-side resources was recognized as a source for controlling thermal loads [25]. It has been proposed to use aggregated residential loads such as refrigerators, air conditioner and water heaters for ancillary service provision [1, 6, 7, 11]. Also, pre-cooling of buildings to reduce peak load has been proposed [10, 27]. However, most of the currently implemented and suggested load control mechanisms are used for compensating for low frequency changes in demand and supply—i.e., the changes that may occur over relatively large timescales, such as hours.

The inventors have recognized and appreciated that facilities at customer premises, such as commercial buildings, may be employed as ancillary regulation services for a power grid. The commercial buildings have a large thermal storage potential and may, therefore, be a suitable cost-effective resource for providing ancillary services to the power grid. In particular, the thermal storage potential of a commercial building allows changing power consumption by one or more of power consumption components in the building without significantly affecting internal environment in the building. Power consumption components related to environmental control within a facility, including temperature regulation and other HVAC components, may be used for this purpose, but any suitable power consumption components may be regulated. Thus, an ancillary service may be provided by the building without disrupting its normal operation.

The inventors have recognized and appreciated that buildings can be used to provide ancillary services, for at least three reasons. First, compared to a residential building, a commercial building can provide a larger amount of a demand response due to its larger thermal inertia. Second, approximately one third of the commercial building floor space is equipped with variable frequency drives that operate the heating, ventilation and air conditioning (HVAC) equipment. These devices can be commanded to vary their speed and power consumption quickly and continuously, instead of in an on/off manner. This may be an advantage for providing regulation services, since a regulation signal from a power grid operator may be used to adjust power consumption of components in the building in the order of minutes or seconds, or, in some embodiments, a low number of hours. In some embodiments, different parameters of operation of the devices, and/or different devices, may be modulated to adjust power consumption over different time scales.

The specific parameters and/or devices may be selected based on the frequency content of the regulation signal, in some embodiments. In some embodiments, a regulation signal may be regarded as having at least two frequency bands, a lower frequency band and a higher frequency band. The lower frequency band may be defined to include frequencies lower than $1/(3 \text{ minutes})$. Though, in other embodiments, the lower frequency band may be bounded by any other suitable frequency, including, for example, $1/(5 \text{ minutes})$ or $1/(1 \text{ minute})$. The lower frequency band may also have a lower bound which, in some embodiments, may be $1/(60 \text{ minutes})$. However, in other embodiments, the lower bound may be $1/(30 \text{ minutes})$ or $1/(120 \text{ minutes})$ or any other suitable value.

The upper frequency band may likewise be bounded. In some embodiments, a lower bound of the upper frequency band may be contiguous with the upper bound of the lower frequency band. Though, in other embodiments, the upper frequency band may have a lower bound that is higher than the upper bound of the lower frequency band, and may be, for example, $1/(10 \text{ minutes})$, $1/(3 \text{ minutes})$, $1/(2 \text{ minutes})$ or $1/(1 \text{ minute})$, for example. The upper frequency band may also have an upper bound that may be, for example, $1/(8 \text{ seconds})$, $1/(15 \text{ seconds})$, $1/(30 \text{ seconds})$, or any other suitable value.

Third, a large fraction of commercial buildings in the United States are equipped with Building Automation Systems [14]. These systems can receive regulation signals from grid operators and manipulate control variables needed for providing regulation services, without requiring additional equipment (e.g., smart meters, etc.). Ancillary services may thus be provided at essentially no cost and may be implemented as a simple add-on to existing HVAC control systems. Moreover, buildings account for about 75% of total electricity consumption in the U.S., with roughly equal share between commercial and residential buildings [3]. Thus, existing infrastructure of a large number of commercial buildings may be used in an effective way to provide ancillary services to the power grid.

Accordingly, some embodiments provide techniques to use loads of commercial buildings to provide ancillary services to a power grid on faster timescales (of seconds, minutes, and a low number of hours) than conventional generators. The ancillary services may comprise frequency regulation of the power grid, load following on the power grid, or any other types of ancillary services. Commercial buildings may provide a regulation service more effectively, using their existing infrastructure. Moreover, high frequency load changes in commercial buildings may provide the ancillary services at a very low cost. Lower frequency load changes may provide a greater ancillary service.

In some embodiments, power consumption of fans in the building's HVAC system may be controlled to provide ancillary services to a power grid. A feedforward control architecture may be utilized, wherein the fan speed commanded by the building's existing control system is modified so that the change in the fan's power consumption tracks the regulation signal from the grid operator. Such a control architecture may be used, for example, with higher frequency regulation signals and/or higher frequency components of a regulation signal.

In some embodiments, power consumption of chillers in the building's HVAC system may be controlled to provide ancillary services to a power grid, wherein the air flow rate commanded by the building's existing control system is modified so that the change in the chiller's power consumption tracks the regulation signal from the grid operator. Such a control architecture may be used, for example, with lower frequency regulation signals and/or lower frequency components of a regulation signal.

FIG. 1 shows an exemplary power grid system 100 in which some embodiments may be implemented. A power plant 102 connected to a power grid 104 may produce power and supply it to customer premises 106A-106C via power grid 104, as schematically shown in FIG. 1. The power is transferred from generators at power plant 102 to loads at customer premises 106A-106C through transmission lines, substations, transformers and other components forming power grid 104. It should be appreciated that power grid 104 typically comprises a large number of customers, such as customer premises 106A-106C, and is connected to multiple power plants and generators. It should also be appreciated that, though a single power plant 102 is shown in this example, power plant 102 may include multiple power plants connected to power grid 104.

FIG. 1 further shows a grid operator 108 which manages transmission of power via power grid 104 to customer loads at customer premises 106A-106C. Grid operator 108 may comprise, for example, a grid controller that controls operation of power grid 104. Grid operator 108 may be located outside power plant 102. It should be appreciated that embodiments are not limited to a particular location or implementation of grid operator 108.

To balance supply and demand in power grid 104, support transmission of power from sellers to purchasers to loads, and manage reliable operation of power grid 104, power grid 104 may utilize ancillary services, such as, for example, regulation ancillary services.

Figure 3:
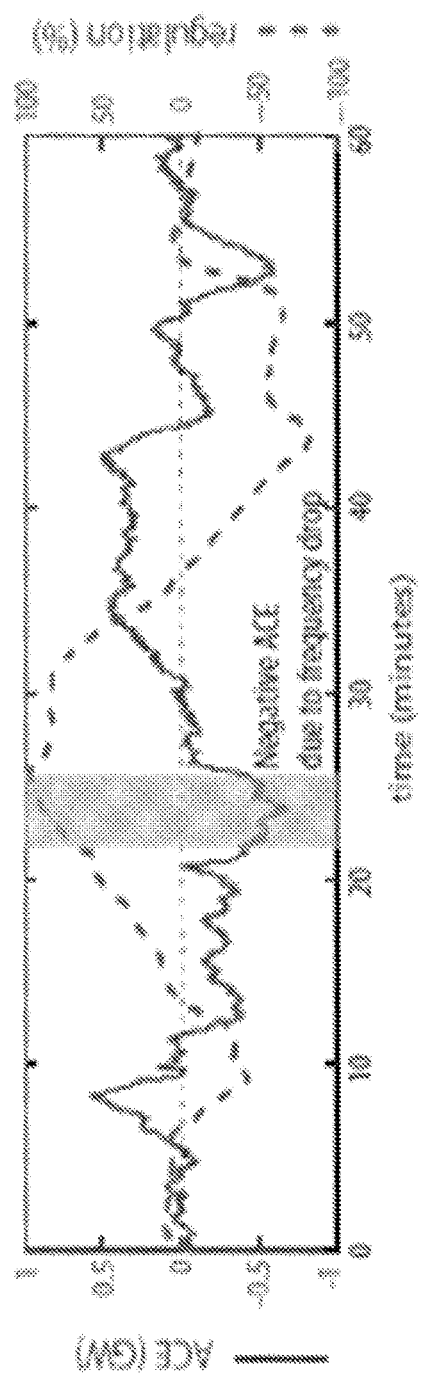
FIG. 3 illustrates ACE and regulation signal for a typical hour within PJM; data obtained from PJM archives [8]. The regulation signal is expressed in percentage of the total service they are required to provide.

Conventionally, a power grid uses generators as regulation ancillary services. Thus, grid operator 108 may transmit a regulation signal to one or more generators (not shown) to ramp up and down their power output to compensate for fluctuations in power drawn from power grid 104. This regulation signal can be constructed from the area control error (ACE) which measures the amount of (positive or negative) megawatts (MWs) needed in the system. FIG. 3 shows an ACE pattern, along with the regulation signal sent to generators. The signal is inverted in sign to compensate for the lacking MWs (negative ACE) by increasing the generation and vice versa. The regulation signal may be constructed by filtering the ACE to accommodate physical constraints on the generators [17, 20] and, hence, is smoother than the ACE, as illustrated in FIG. 3.

In some embodiments, a grid operator controlling aggregated resources and loads in a power grid may generate a regulation signal that is associated with an ancillary service for the power grid. The regulation signal may be specific to the customer premises and may be generated by the grid operator based on parameters acquired from the customer premises, such as, for example, a capacity of facilities at customer premises for power regulation.

The grid operator (e.g., grid operator 108) may transmit the generated regulation signal to a customer premises to implement the ancillary service. In this way, the grid operator may control the operation of a power grid so that the grid receives ancillary services from multiple customer premises.

The regulation signal transmitted by the grid operator in accordance with some embodiments may be used to adjust load at the customer premises based on the fluctuations in supply and demand in the power grid. Grid operator 108 may determine an amount of load to be adjusted in power grid 104 and may allocate to each of multiple facilities at the customer premises an adjustment in power consumption to achieve a load adjustment based on the determined amount. Grid operator 108 may generate and transmit in a suitable manner to each of the facilities at customer premises 106A the regulation signal indicating the adjustment in power consumption allocated to that facility. In some embodiments, the regulation signal may be separated into higher and lower frequency components before being sent to a facility. Such signal splitting may be achieved using filtering or other known signal processing techniques. In this way, some facilities may receive higher frequency regulation signals and other facilities may receive lower frequency regulation signals. In such an embodiment, different facilities may employ control architectures adapted for the frequency band of the regulation signal. Alternatively or additionally, facilities may be configured to apply higher frequency and lower frequency control architectures and may receive the regulation signal and then determine appropriate control architectures to employ based on the frequency content to the regulation signal.

In the example illustrated, customer premises 106A may provide ancillary services to power grid 104. Accordingly, to control the operation of power grid 104 using the ancillary services, grid operator 108 may provide a regulation signal 110 to customer premises 106A. Each facility at the customer premises 106A (e.g., one or more commercial buildings) may have a different capability in adjusting its power consumption as part of providing the ancillary services. Thus, grid operator 108 may determine an amount of the adjustment in power consumption allocated to the facility based on the amount of load to be adjusted in power grid 104 and the capability of that facility.

In some embodiments, grid operator 108 may transmit regulation signal 110 to one or more facilities at customer premises 106A to control operating parameters of one or more power consumption components at the facility. The facility that receives regulation signal 110 may be one or more commercial buildings each having at least one power consumption component. The commercial building may have a capability to modify at least one operating parameter of the power consumption component so that power consumption by that component is changed in accordance with regulation signal 110. In some embodiments, the power consumption component may be a component of a Heating, Ventilation, and Air Conditioning (HVAC) system, such as one or more fans and/or one or more chillers. Though, other power consumption components may be substituted.

A thermal capacity of commercial buildings enables use of the buildings for providing ancillary services by adjusting power consumption by the buildings based on the regulation signal within long periods of time, short periods of time, or even in real time. Thus, the commercial buildings may provide the ancillary services for regulating long or short time fluctuations in the power grid. In some embodiments, different power consumption components, or different parameters of the same power consumption component, may be adjusted to provide ancillary services over different time periods.

Accordingly, in some embodiments, grid operator 108 may utilize ancillary services on power grid 104 to correct deviations from the balance in supply and demand within seconds, minutes, or a low number of hours. Thus, the regulation signal may have primary frequency components indicative of changes in power consumption over a time in a range from 4 seconds to 5 minutes, 4 seconds to 10 minutes, 4 seconds to 20 minutes, 3 minutes to 30 minutes, 3 minutes to 60 minutes, 3 minutes to 120 minutes, or in any other suitable ranges.

In some embodiments, grid operator 108 may control the operation of power grid 104 to measure in real time an imbalance between power generated on power grid 104 and load on the power grid. To compensate for the imbalance using the ancillary services provided by the customer premises, grid operator 108 may transmit, in real time, a regulation signal to the customer premises (e.g., regulation signal 110 to customer premises 106A in FIG. 1) indicating an allocated amount of the adjustment in power consumption by the customer premises. Alternatively or additionally, the imbalance may be computed based on a comparison of a regulation signal, or a regulation signal projected to a future point in time and/or a power consumption projected to a future point in time. Such projections may be computed using a Kalman filter or any other suitable computational techniques. Such projections may be employed, for example, when there is a delay between an adjustment of an operating parameter and a change in power consumption of a power consumption component.

Some embodiments provide techniques for providing ancillary services to a power grid using a customer premises. A suitable component at the customer premises may implement the ancillary services in accordance with the techniques described herein.

Figure 2:
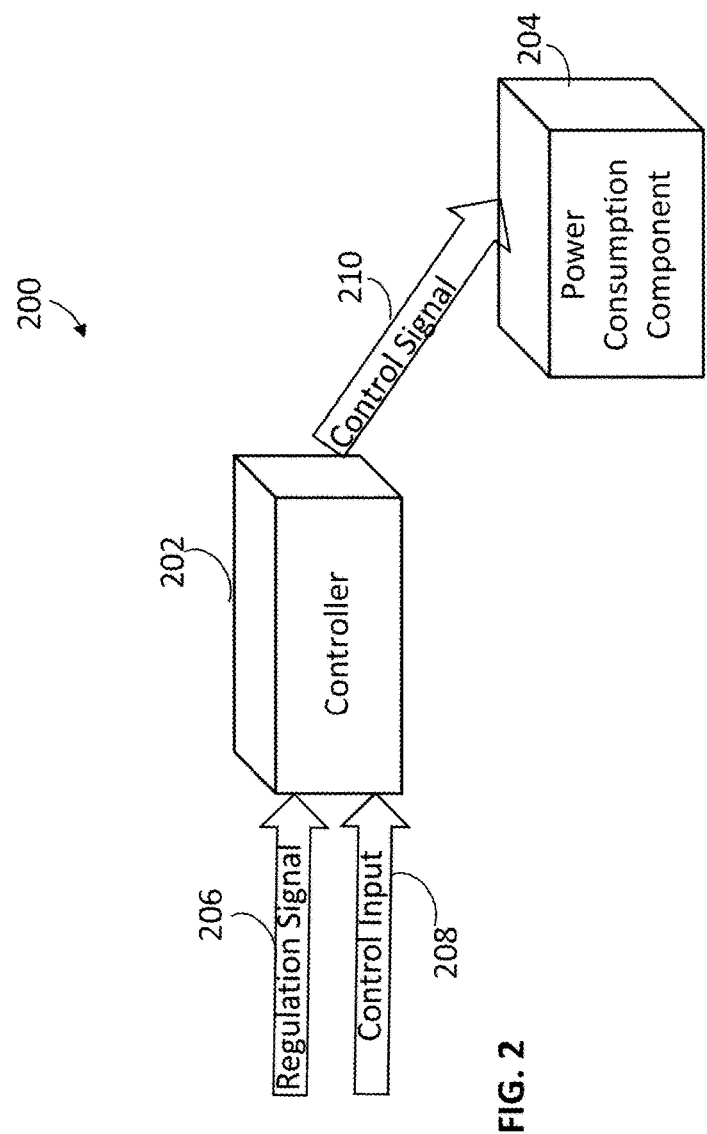
FIG. 2 is a schematic diagram of a control system in a commercial building providing ancillary services to a power grid, in accordance with some embodiments.

Thus, FIG. 2 illustrates schematically an example of a control system 200 at a customer premises that provide ancillary services to a power grid, in accordance with some embodiments. Customer premises may be, for example, customer premises 106A (FIG. 1), or any other suitable customer premises having facilities comprising power consumption components. The customer premises may be, for example, a commercial building comprising one or more power consumption components which can be controlled to adjust their power consumption based on a regulation signal received from a grid operator.

In some embodiments, a suitable component of the commercial building at the customer premises, such as a controller 202 in FIG. 2, may be used to control power consumption by one or more power consumption components, such as a power consumption component 204, to provide ancillary services to the power grid.

Controller 202 may be implemented in any suitable manner. For example, in some embodiments, controller 202 may comprise a thermostat adapted to control at least a portion of the HVAC system. In such embodiments, controller 202 may comprises a housing having terminals for wires connected to a controller for a portion of a Heating, Ventilation, and Air Conditioning (HVAC) system. However, it should be appreciated that controller 202 may be any suitable apparatus having any suitable circuitry for implementing functions as described herein, as embodiments of the invention are not limited in this respect.

In some embodiments, power consumption component 204 comprises at least one component of an HVAC system in a commercial building at the customer premises. For example, power consumption component 204 may be at least one fan and/or at least one chiller. Though, it should be appreciated that any other suitable power consumption component may be substituted, as embodiments of the invention are not limited in this respect. It should also be appreciated that one component 204 is shown by way of example only, and it should be appreciated that multiple power consumption components may be controlled by controller 202.

As shown in FIG. 2, controller 202 may receive a regulation signal 206 (e.g., regulation signal 110 shown in FIG. 1). Regulation signal 206 may be used to indicate a change to compensate for a mismatch between load in the power grid and power generation capacity in the power grid.

In some embodiments, controller 202 may, based on the received regulation signal 206, modify at least one operating parameter of power consumption component 204 so that power consumption by power consumption component 204 is changed in accordance with the regulation signal 206. Regulation signal 206 may be associated with an ancillary service for the power grid and may indicate a change in power consumption at the customer premises—e.g., a change in power consumption by power consumption component 204—to implement the ancillary service.

In FIG. 2, in addition to regulation signal 206, controller 202 may also receive control input 208, which may indicate an operating state of power consumption component 204. In some embodiments, control input 208 may be derived, at least partially, from a user input specifying an operation of power consumption component 204. In other embodiments, control input 208 may be generated automatically, in a suitable manner.

Controller 202 may, based on received regulation signal 206 and control input 208, control power consumption by power consumption component 204 to provide the ancillary services to the power grid. In particular, controller 202 may modify at least one operating parameter of power consumption component 204 by computing the at least one operating parameter based on regulation signal 206 and control input 208. In the example illustrated, controller 202 may thus generate a control signal 210 for power consumption component 204, where control signal 210 may control power consumption component 204 based on the computed operating parameter.

Alternatively, controller 202 may control power consumption by power consumption component 204 to provide the ancillary services to the power grid based on a predictor (shown in FIG. 13) predicting the regulation signal 206 and/or on control input 208. In particular, controller 202 may modify at least one operating parameter of power consumption component 204 by computing the at least one operating parameter based on a predictor predicting the regulation signal 206 and/or on control input 208.

Control signal 210 may be used to modify the at least one operating parameter of power consumption component 204 so that power consumption by component 204 increases or decreases, based on regulation signal 206. For example, when regulation signal 206 indicates that a mismatch between load and power generation capacity in the power grid is such that the generation capacity exceeds demand, the at least one operating parameter may be modified so that the power consumption by power consumption by component 204 increases.

In embodiments where power consumption component 204 comprises a fan and/or a chiller or another component of an HVAC system, a speed of the fan or air flow rate through the HVAC system may be modified to provide the ancillary service to the power grid. However, it should be appreciated that power consumption by different types of power consumption components at a customer premises may be controlled using the described techniques to provide ancillary services to the power grid.

In some embodiments, a regulation signal received from a grid operator may be used to correct long-term or short-term fluctuations in supply and demand. For example, the regulation signal (e.g., regulation signal 110 in FIG. 1 or regulation signal 206 in FIG. 2) may have primary frequency components indicative of variations in power consumption over a time ranging from 4 seconds to 10 minutes, over a time ranging from 4 seconds to 20 minutes, over a time ranging from 3 minutes to 60 minutes, or over a time ranging from 3 minutes to 120 minutes. Though, it should be appreciated that the regulation signal may be used to indicate variations in power consumption at customer premises at any other time ranges. In some embodiments, the specific component or operating parameter adjusted may be selected based on the time range over which the power consumption is adjusted. Moreover, in some embodiments, the regulation signal may be used to modify power consumption at customer premises at real time.

In some embodiments, power consumption by a power consumption component in a facility, such as commercial building, at a customer premises providing ancillary services is changed without a noticeable impact on an environment inside the building—e.g., without impacting a comfort level of occupants of the building and without disrupting normal operation of the building. For example, the power consumption by the power consumption component may be changed so that a temperature in the commercial building changes by no more than 0.2, 0.5 or 1 degree Celsius relative to a user specified temperature.

High-Frequency Fan-Based Embodiments

In some embodiments, the regulation signal may have primary frequency components falling in a higher frequency range. In response to such higher frequency variations, operating parameters of one or more power consumption components may be adjusted. The specific components or parameters adjusted may be selected based on the frequency components of the regulation signal. As a specific example, higher frequency control may be implemented by controlling fan speed to adjust the power consumed by the fan in proportion to the regulation signal. The inventors conducted experiments where a simplified dynamic model of a building's HVAC system was used to design a controller for the building. The model parameters were identified from data collected from a commercial building in the University of Florida campus (Pugh Hall). The controller was then tested on a high fidelity non-linear model constructed from the same building. The results showed that the simplified model is adequate for the purpose of control; the controller performs on the complex model as predicted by the simplified model. Numerical experiments show that it is feasible to use up to 15% of the total fan power for regulation service to the grid, without noticeably impacting the building's indoor environment and occupants' comfort, provided the bandwidth of regulation service is suitably constrained. To ensure the comfort of occupants, and to manage stress on HVAC equipment, both upper and lower bounds on bandwidth are necessary. Based on simulation experiments, this exemplary bandwidth is determined to be $[1/\tau_0, 1/\tau_1]$, where $\tau_0 \approx 10$ minutes, and $\tau_1 \approx 4$ seconds.

Control System

Configuration of an HVAC System in a Commercial Building

Figure 4:
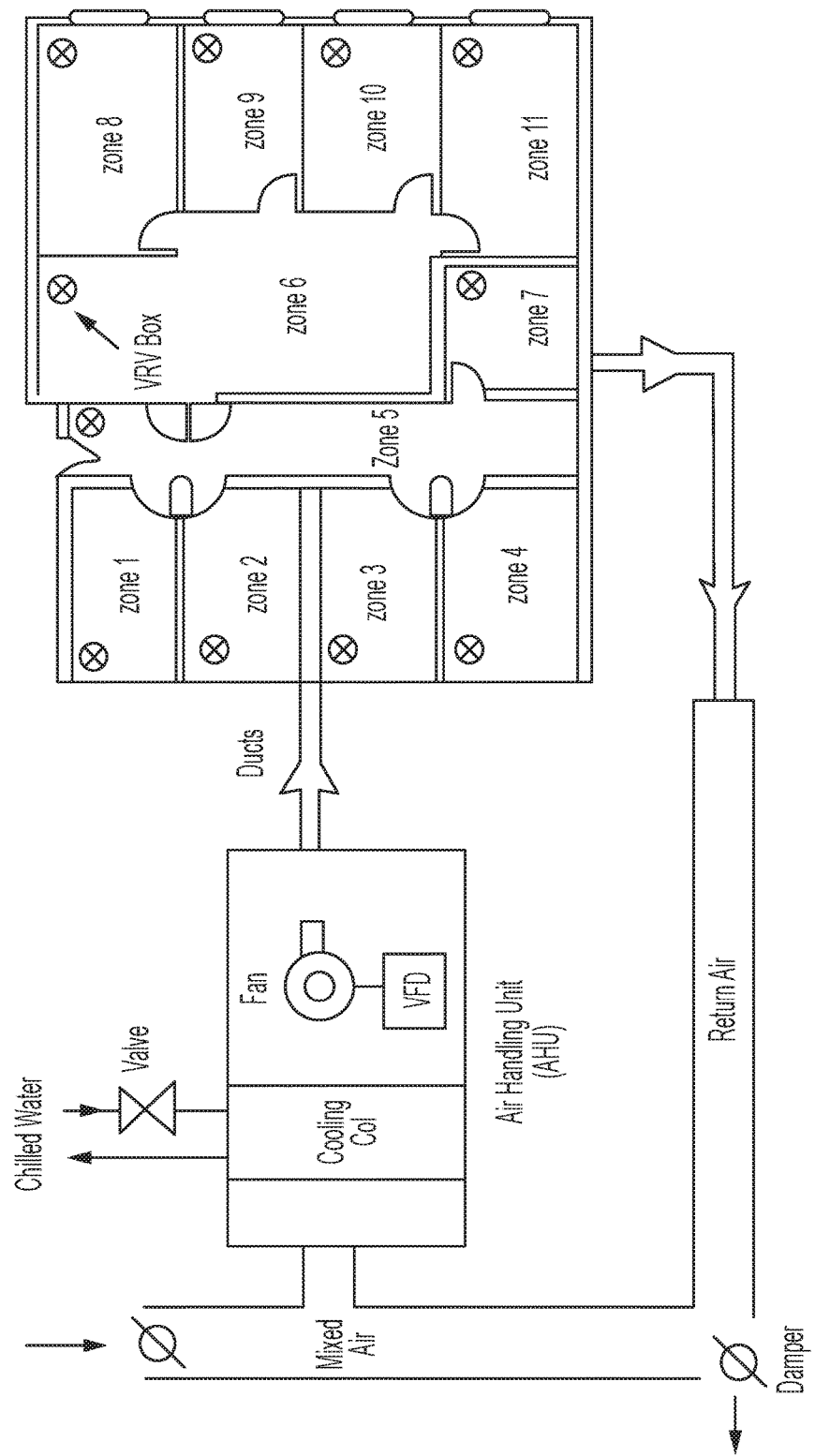
FIG. 4 is a schematic diagram illustrating an exemplary commercial building HVAC system that services 11 zones.

An example of an HVAC system that may be used in a commercial building, called a variable air volume (VAV) system, is shown in FIG. 4. Its main components comprise an air handing unit (AHU), a supply fan, and VAV boxes. The AHU recirculates the return air from each zone and mixes it with fresh outside air. The ratio of the fresh outside air to the return air is controlled by dampers. The mixed air is drawn through the cooling coil in the AHU by the supply fan, which cools the air and reduces its humidity. In cold/dry climates it may also reheat and humidify the air. The air is then distributed to each zone through ducts. The VAV box at each zone has two actuators—a damper and a reheat coil. A controller at each zone, which is referred to herein as a zonal controller, manipulates the mass flow rate of air going into the zone through the damper in the VAV box so that the temperature of the zone tracks a prespecified desired temperature, called a zone set point. When the zone temperature is lower than the desired value, and the flow rate cannot be reduced further due to ventilation requirements, the zonal controller uses reheating to maintain the zone temperature. As the zonal controllers change the damper positions in response to local disturbances (heat gains from solar radiation, occupants and so on), the differential pressure across the AHU fan changes, which is measured by a sensor. A fan controller changes the AHU fan speed, through a command to the variable frequency drive (VFD), so as to maintain the differential pressure to a predetermined setpoint. The VFD is a fast-responding and programmable power electronic device that changes the fan motor speed by varying motor input frequency and voltage. The command sent to the VFD as the nominal fan speed command. Since the air flow rate through the AHU is constantly changing to meet the demand from the zonal controllers, the system is called a VAV system. A complex interaction between a set of decentralized controllers and a top-level fan controller maintains the building at an appropriate temperature while maintaining indoor air quality.

Implementation of the Control System

The regulation signal sent by the grid operator is typically a sequence of pulses at 2-4 second intervals [9]. In the case of loads engaged in regulation, the magnitude of the pulse is the amount of deviation in their power consumption asked by the grid operator. The building may be required to provide r(t) (in kW) amount of regulation service at time t. This signal is referred to herein as the (building-level) regulation reference. The job of a (building-level) regulation controller is to change the power consumption of the building so that the change tracks the regulation reference.

Figure 5:
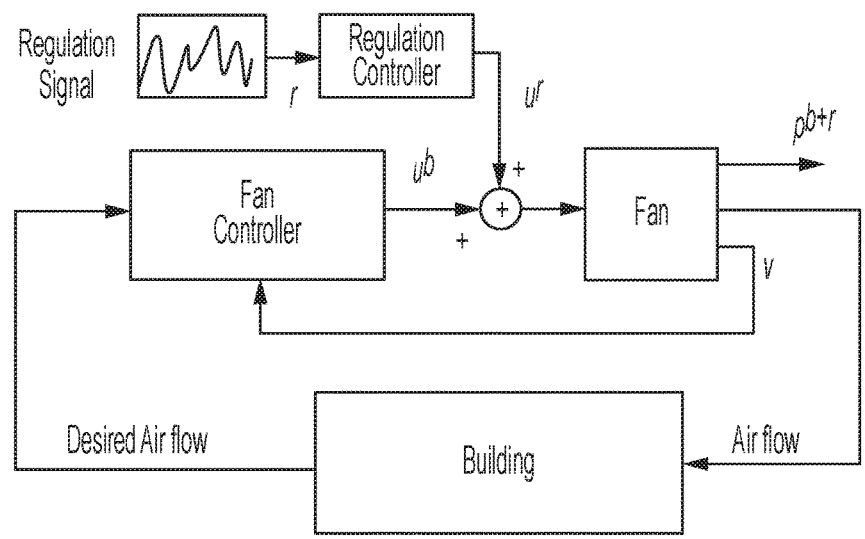
FIG. 5 is a schematic diagram of a controller in a commercial building providing ancillary services to a power grid, which may be used in connection with higher frequency variations in a regulation signal, in accordance with some embodiments. A transformed regulation signal will be used to compute the additional fan speed command $u^r(t)$ so that the resulting deviation of the fan power $p^{b+r}(t)$ from the nominal value $p^b(t)$ tracks the regulation signal $r(t)$, while having little effect on the indoor temperatures.

In some embodiments, a feedforward controller may be utilized to modify at least one operating parameter of one or more power consumption component in the building so that power consumption by the component(s) is changed in accordance with the regulation signal. The controller changes the command to the fan so that the fan's power consumption is changed in such a way that the deviation in consumption—both positive and negative—tracks the regulation reference r(t). The architecture of the control system is shown in FIG. 5. The regulation signal r is transformed to a regulation command $u^r$ by the regulation controller. This command is then added to the nominal fan speed command $u^b$ produced by the building's fan controller. In some embodiments, $p^b(t)$ is the nominal power consumption of the fan due to the thermal load on the building, and $p^{b+r}(t)$ is the fan power consumption with the additional regulation command. The deviation in power consumed by the fan may then be defined as $\Delta p(t) p^{b+r}(t) - p^b(t)$. Thus, changing the fan speed from the nominal value determined by the building's existing control system changes the air flow through the building.

In some embodiments, the power consumption by the power consumption component is changed so that a temperature in the commercial building changes by no more than 1 degree Celsius relative to a user specified temperature. Thus, the regulation command is such that $\Delta p(t)$ tracks r(t) while causing little change in the building's indoor environment (measured by the deviation of the zonal temperatures from their set points).

In some embodiments, the power consumed by the furnace supplying hot water to the VAV boxes (for reheating) and the chiller/cooling tower providing chilled water to the cooling coil of the AHU are taken to be independent of the power consumed by the fan. In many HVAC systems, the furnaces consume natural gas instead of electricity. The dynamic interconnection between the AHU and the chiller can be thought of as a low pass filter due to the large mechanical inertia of the chiller/cooling tower equipment. Therefore, high frequency variations in the fan power will not change the power consumption of the chiller/cooling tower. Thus, the decoupling assumption—that fan power variations do not change chiller power consumption—holds as long as the variations are fast and of small magnitude. In addition, in some HVAC systems chilled water is supplied from a water storage tank. For such systems, the decoupling assumption holds naturally.

Operation of the Control System

The dynamics of the complete closed loop system of a building that relates zone temperatures to fan speed command may be complex due to the interconnection of the zone-level controlled dynamics, dynamics of pressure distribution in the ducts, and building-level fan controller. An exemplary simplified model of some of these components may be utilized to design the control system for a commercial building.

HVAC Power Consumption Model

The power consumption of a fan is proportional to the cubic of its speed [22]:

$$p(t) = c_1 (v(t))^3, \quad (1)$$

where $c_1$ is a constant, and v is the normalized fan speed in percentage. For example, 100 indicates that the fan is running at full speed, and 50 means it is running at half speed. The fan speed is controlled by a fan controller so that the total mass flow rate tracks a desired total mass flow rate, denoted by $m^d(t)$. In practice, the desired mass flow rate, $m^d(t)$, is communicated to the fan speed indirectly through a change in the duct pressure caused by the actions of the zonal controllers. In this example, it is assumed that the fan controller senses the desired value directly and changes the fan speed to make the actual mass flow rate through the AHU, m(t), track $m^d(t)$.

The mass flow rate has a linear relationship with the fan speed, $$m(t) = c_2 v(t), \quad (2)$$

where $c_2$ is a constant. Similarly, given a desired air flow rate $m^d(t)$, the corresponding desired fan speed that the fan controller tries to maintain is $v^d(t) = m^d(t)/c_2$. In practice, the fan speed is controlled by the VFD which also accelerates or decelerates the fan motor slowly in the interest of equipment life. Because of this ramping feature of VFD, the transfer function from the control command to the fan speed is of first-order, as follows:

$$\tau \frac{dv(t)}{dt} + v(t) = u(t), \qquad (3)$$

where $\tau$ is the time-constant, and $u(t)$ is the fan speed command sent by the fan controller. The fan speed controller is typically a PI controller. As used herein, the proportional and integral gains of fan speed controller are denoted as $K_p^{fan}$ and $K_I^{fan}$. In the described example, $v$, $v^d$ and $u$ are all measured in percentage.

Fan Power Model

The parameters $c_1$, $c_2$ and $\tau$ representing the fan power consumption, air flow rate and fan speed, respectively, in the models (1)-(3) may be estimated using data acquired from a commercial building.

Figure 6:
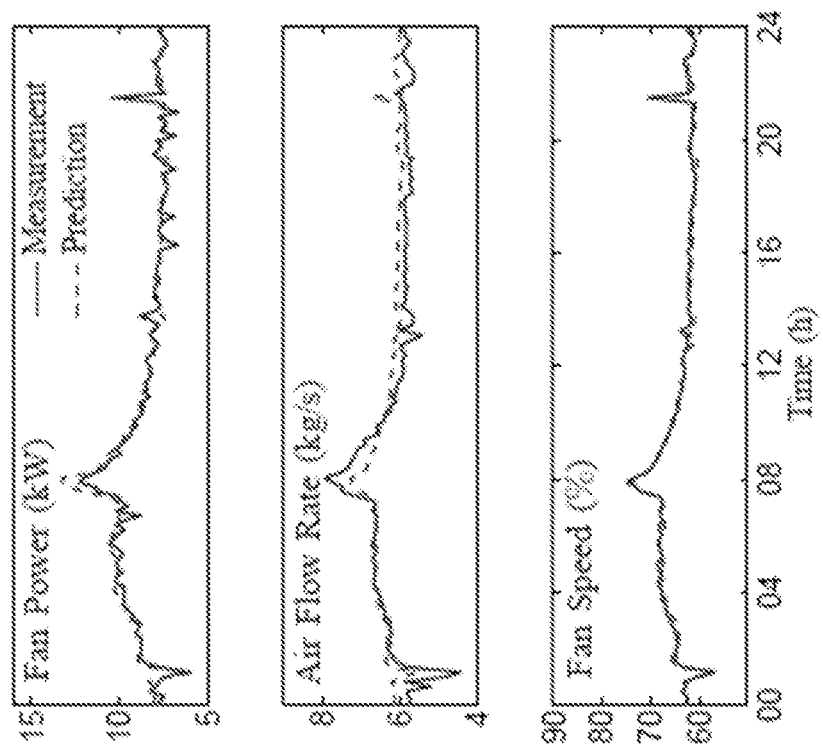
FIG. 6 are graphs illustrating a comparison of fan model predictions with measurements from an exemplary building (Pugh Hall at the University of Florida). The top plot depicts measurement and prediction of fan power $p(t)$ from measured fan speed $v(t)$ with estimated $c_1$ and model (1). The middle plot shows comparison of measurement and prediction of air flow rate $m(t)$ from measured fan speed $v(t)$ with estimated $c_2$ and model (2). The bottom plot depicts measurement and prediction of fan speed $v(t)$ from measured fan input $u(t)$ with estimated $\tau$ and model (3).

As an example, in experiments conducted by the inventors data was collected from the Pugh Hall. The data was collected from one of the three AHUs in the building with a 35-kW rated fan motor which supplies air to 41 zones. Using a randomly chosen 24 hour long data set, the parameters were estimated to be $c_1=3.3\times10^{-5}$ kW, $c_2=0.0964$ kg/s, and $\tau=0.1$ s. FIG. 6 shows predicted versus measured data for the three variables: fan power consumption, air flow rate and fan speed. As shown in FIG. 6, the predicted models (1)-(3) with the estimated parameters are good fits for the actual measurements.

Linearized Thermal and Power Models

In some embodiments, a simplified thermal model of the building may be used which is based on the aggregate building temperature $T(t)$ defined as an average temperature of all zones. This simple non-linear thermal model relates the total mass flow rate to the building temperature. Then, this model is linearized around an nominal equilibrium point. The corresponding linearized power model is also described herein.

As an example, the following physics-based thermal model of the building may be utilized:

$$C\frac{dT}{dt} = -\frac{1}{R}(T - T_{oa}) + c_p m(T_{la} - T) + Q, \qquad (4)$$

where $C$, $R$ are the thermal capacitance of the building and the resistance that the building envelope provides to heat flow between the building and the outside. $T_{oa}$ is the outside air temperature, $c_p$ is the specific heat of air, $m$ is the supply air flow rate, and the leaving air temperature $T_{la}$ is the temperature of the air immediately downstream of the AHU. As one example, this temperature may be 12.8° C. The first term on the RHS of (4) represents the heat loss to the outside through the walls, and the second term denotes the net heat gain from the circulation of air. The last term $Q$ is the heat gain from reheating, solar radiation, occupants, lights, etc. During normal business hours, the building's HVAC system operates near a steady-state status and the indoor temperature is maintained at a fixed setpoint. For instance, as one example, this setpoint may be about 22.5° C. during 07:30 am-22:30 pm. This allows to linearize the dynamics. At steady-state, from (4):

$$0 = -\frac{1}{R}(T^* - T_{oa}) + c_p m^*(T_{la} - T^*) + Q, \qquad (5)$$

where $T^*$ and $m^*$ are the steady-state temperature and supply air flow rate. In addition, it may be assumed that $T_{oa}$ and $Q$ are constant for the time durations under consideration. Now define $\tilde{T}$ and $\tilde{m}$ as the deviations of the building temperature and supply air flow rate from their nominal values $T^*$ and $m^*$:

$$T=T^*+\tilde{T}, m=m^*+\tilde{m}. \qquad (6)$$

Substituting (6) into (4), and using (5), the linearized model of building thermal dynamics may be defined as follows:

$$\frac{d\tilde{T}}{dt} = -\frac{1 + c_p R m^*}{CR}\tilde{T} + \frac{c_p(T_{la} - T^*)}{C}\tilde{m}. \qquad (7)$$

In practice, although the outside air temperature $T_{oa}$ and the heat gain $Q$ from solar radiation, occupants and other factors are time-varying, the changes in these parameters are slower than the thermal and power consumption dynamics. Thus, the parameters $T_{oa}$ and $Q$ may be taken as constant only for design of the model. However, it should be appreciated that in practice these parameters vary in time.

Next, the effect of all the zonal controllers may be aggregated into one controller referred to herein as a building temperature controller. Such controller may compute the desired total mass flow rate $m^d(t)$ based on the difference between the desired building temperature $T^d$ and actual building temperature $T(t)$, and then signal the fan controller to provide this mass flow rate. The building temperature controller may be, for example, a PI controller. The input to the PI controller may be the temperature deviation from its desired value $\tilde{T}$, and the output of the controller may be the desired air flow rate $m^d$. The proportional and integral gains are denoted by $K_P^B$ and $K_I^B$ respectively.

A linearized fan power consumption model is constructed in terms of the deviations $\tilde{p}=p-p^*$, $\tilde{v}=v-v^*$, where $p^*$ and $v^*m^*/c_2$ are the nominal power consumption and speed of the fan. Substituting the above equations into (1), the following linearized model for fan power deviation may be obtained:

$$\tilde{p}(t)=3c_1(v^*)^2\tilde{v}(t). \qquad (8)$$

The model is used to determine how the fan speed changes so that the fan power deviation tracks the regulation signal.

Regulation by Fan Command Manipulation

Buildings can provide regulation services to the grid without causing discomfort to occupants or damaging the HVAC equipment so long as the bandwidth of the regulation signal is suitably constrained. The considerations in determining this bandwidth are described herein along with the control strategy implemented to extract regulation services.

The bandwidth of the regulation signal sent to buildings should be chosen with the following factors taken into account. First, high frequency content in resulting regulation command $u^r$ (FIG. 7) is desirable up to a certain upper limit. Since the thermal dynamics of a commercial building have low-pass characteristics due to its large thermal capacitance, high frequency changes in the air flow cause little change in its indoor temperature. The statement is also true for individual zones of the building. Additionally, the VFD and fan motor have large bandwidth so that high frequency changes in the signal $u^r$ lead to noticeable change in the fan speed and, consequently, fan power. Both effects are desirable, since the described techniques affect the fan power consumption without affecting the building's temperature.

However, a very high frequency content in $u^r(t)$ may not be desirable as it might cause wear and tear of the fan motor. Likewise, if $u^r$ were to have a very low frequency content, even if the magnitude of $u^r$ is small, it may cause significant change in the mass flow rate, which in turn can produce a noticeable change in the temperature of the building. Furthermore, a large enough change in the temperature may cause the zonal controllers to try to change air flow rate to reverse the temperature change. In effect, the building's existing control system may try to reject the disturbance caused by $u^r$. Being a feedback loop, this disturbance rejection property is already present in the building control system. If the controllers in the building (e.g., fan controller and the zonal controllers) do not have high bandwidth, they may not reject high frequency disturbance. In short, the frequency content of the disturbance $u^r(t)$ should lie in a particular band $[f_{low}, f_{high}]$, where the gain of the closed loop transfer function from $u^r$ to fan speed v is sufficiently large while that of the transfer function from $u^r$ to temperature T is sufficiently small.

In some embodiments, the parameters $f_{low}$, $f_{high}$ are design variables to compute a suitable regulation signal for a building. These variables describing the bandwidth along with the total capacity of regulation that the building can provide may be communicated to the grid operator and used in constructing an appropriate regulation signal for the building.

In some embodiments, the regulation signal for the building may be generated by first passing the ACE data r(t) through a bandpass filter with a passband $[f_{low}, f_{high}]$ and then constructing the PI gains of the fan controller and zonal controllers so that the closed loop gain criteria described above are met. This process may be an iterative process.

Figure 7:
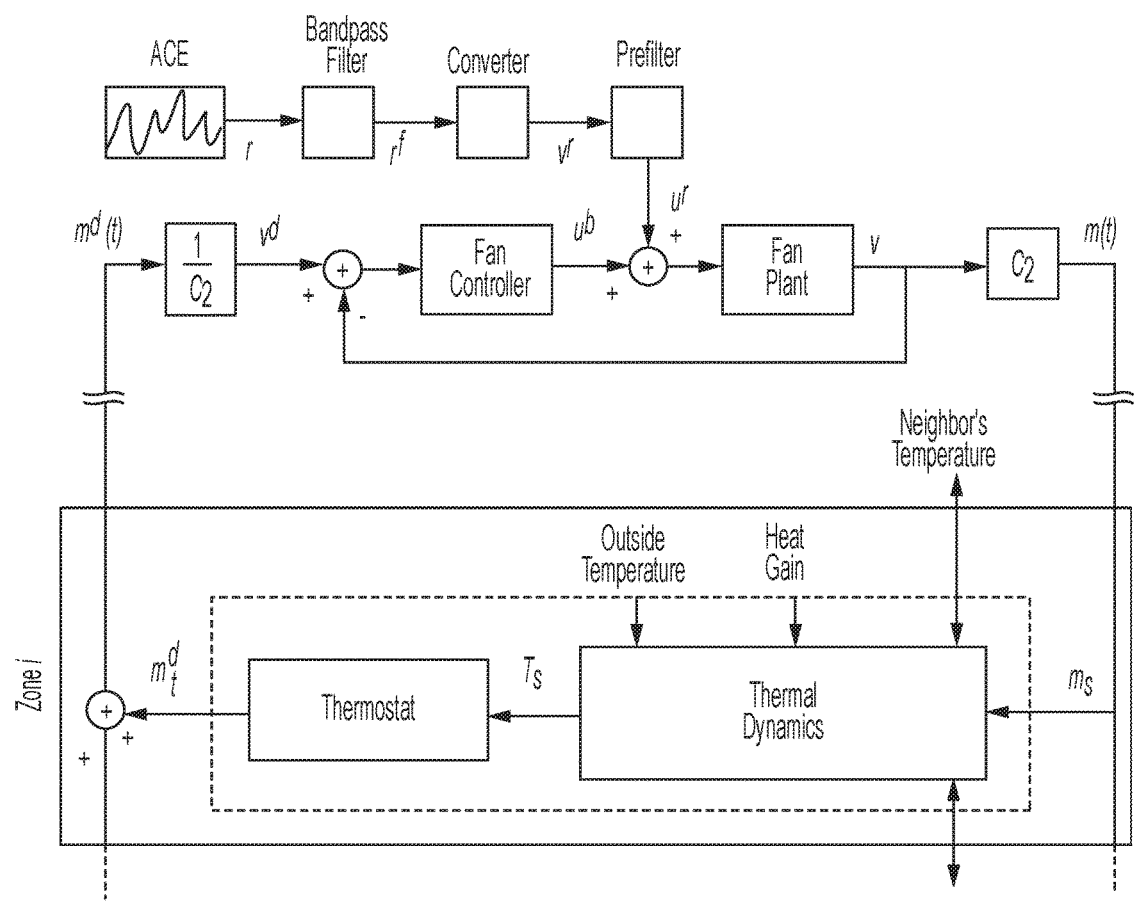
FIG. 7 is a schematic representation of the interconnection between zone supply air flow request and the fan speed control architecture integrated with regulation.

For example, the regulation signal to be tracked by the building may be denoted as r filt(t). This signal may then be converted into speed deviation command using Eq. (8). Specifically, converter block in FIG. 7 is a static function that computes the command $v^r$ as follows:

$$v^r = \frac{r\ filt(t)}{3c_1(v^b)^2}, \tag{9}$$

where $v^b$ is the nominal fan speed due to the thermal load on the building. The command $v^r$ is passed through a prefilter to produce the command $u^r$. The fan speed command that is sent to the VFD is $u^b+u^r$. The prefilter may be used to ensure that the gain of the transfer function from $v^r$ to v in the band $[f_{low}, f_{high}]$ is close to 1, as shown in the bottom plot of FIG. 8.

Figure 8:
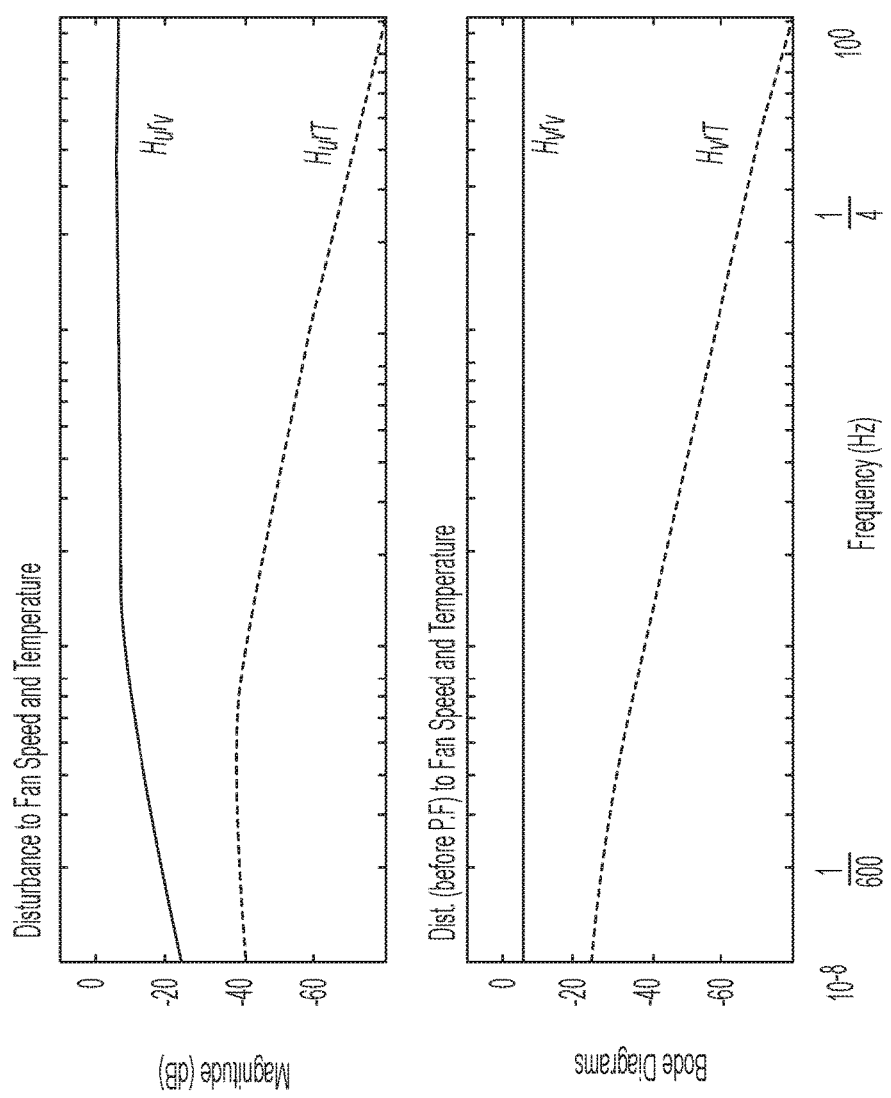
FIG. 8 are graphs illustrating a magnitude vs. frequency of the closed loop transfer functions from disturbance to fan speed $H_{u^r v}$, from disturbance to temperature $H_{u^r T}$ (top plot) and from disturbance (before P.F.) to fan speed $H_{v^r v}$, from disturbance (before P.F.) to temperature $H_{v^r T}$ (bottom plot). Inside the frequency band at which the regulation command enters the loop has a relative high gain for the fan speed output, but the temperature response has extremely low gain in that band.

In some embodiments, the regulation signal has primary frequency components indicative of variations in power consumption over a time ranging from 4 seconds to 20 minutes. Thus, in some embodiments, $[f_{low}, f_{high}]$ may be $[1/1200, 1/4]$. Furthermore, in other embodiments, $[f_{low}, f_{high}]$ may be $[1/600, 1/4]$. The prefilter may be designed by computing an approximate inverse of the transfer function from $u^r$ to v. An example of the magnitude responses of four transfer functions are shown in FIG. 8. In FIG. 8, within the prespecified band, with prefilter (bottom plot) or without prefilter (top plot) the transfer function from disturbance (regulation command) to fan speed has a relatively high gain while to the temperature has an extremely low gain.

Simulation Experiments

The inventors have conducted experiments in which a complex physics-based model [23] is used to test performance of a controller.

To model duct pressure dynamics that couple zone level dynamics to the fan dynamics, it was assumed that each zonal controller requires a certain amount of air flow rate, by generating a desired air flow rate command $m_i^d(t)$ in response to the measured temperature deviation from the set point: $T_i^d(t)-T_i(t)$. The total desired supply air flow rate, $m^d(t)$, is the sum of the desired supply air flow rate into each zone $m_i^d(t)$:

$$m^d(t) = \sum_{i=1}^n m_i^d(t). \tag{10}$$

The signal $m^d(t)$ is the input to the fan speed controller: the desired fan speed is computed as $v^d(t)=m^d(t)/c_2$, cf. (2). The actual total mass flow rate is $m(t)=c_2v(t)$, where v(t) is the actual fan speed. It is divided among the zones in the same proportion as the air flow rate demands:

$$m_i(t) = \alpha_i m(t), \tag{11}$$

$$\alpha_i = \frac{m_i^d}{\sum_j m_i^d}.$$

The building's control system effectively performs this function, although signaling is performed through physical interaction and through the exchange of electronic signals.

The thermal dynamic model of a multi-zone building is constructed by interconnection of RC-network models of individual zones and the corresponding zonal controllers. The following RC-network thermal model for each zone in the building may be defined as follows:

$$C_i \frac{dT_i}{dt} = \frac{T_{oa}-T_i}{R_i} + \sum_{j \in N_i} \frac{T_{(i,j)}-T_i}{R_{i,j}} + c_p m_i (T_{la}-T) + Q_i, \tag{12}$$

$$C_{(i,j)} \frac{dT_{(i,j)}}{dt} = \frac{T_i - T_{(i,j)}}{R_{(i,j)}} + \frac{T_j - T_{(i,j)}}{R_{(i,j)}}, \tag{13}$$

The above equation is similar to (4). The differences are that the second term on the RHS of (12) represents the heat exchange between zone i and its surrounding walls that separate itself from neighboring zones, and (13) models the heat exchange between zone i, zone j, and the wall separating them.

A widely used control scheme for zonal controllers in commercial buildings is the so-called "single maximum" Such control scheme includes three operating modes: cooling mode, heating mode, and deadband mode. In the experiments, it is assumed all the zones are in the Cooling Mode. In this mode, there is no reheating, and the supply air flow rate is varied to maintain the desired temperature in the zone. Typically, a PI controller with proportional and integral gains $K_p^{(i)}$, $K_I^{(i)}$ is used that takes temperature tracking error $T_i^d-T_i$ as input and desired air flow rate $m_i^d$ as output.

The high fidelity model of a multi-zone building's thermal dynamics is constructed by coupling the dynamics of all the zones and zonal controllers, with $m_i$'s as controllable inputs, $T_{oa}$, $Q_i$, $T_{la}$ as exogenous inputs, and $T_i$'s and $m_i^d$'s as outputs. The command $m^d$, computed using (10), serves as input to the fan controller, whose output is $u^b$. The total fan command $u^b + u^r$ is the input to the fan, with output fan speed v (which also determines the power consumption and mass flow rate through (1) and (2)). The mass flow rate through each zone, computed using (11), then serves as inputs to the building thermal dynamics. A schematic of the complete closed loop dynamics with the high fidelity model, along with all the components of the regulation controller, is shown in FIG. 7.

Simulations of Using an Exemplary Commercial Building to Provide Ancillary Services to a Power Grid In the experiments, an exemplary building with 4 stories and 44 zones is utilized as an example of a commercial building that can provide ancillary services to a power grid. Each story has 11 zones constructed by cutting away a section of Pugh Hall. FIG. 4 shows a layout of these 11 zones. The HVAC system of the building in this example includes a single AHU and zonal controllers for each of its zones. The building is modeled to represent the section of Pugh Hall serviced by one of the three AHUs that services 41 zones. The zones serviced by each of the AHUs in Pugh Hall are not contiguous, which necessitates such a fictitious construction. The model of each of these 11 zones is constructed from data collected in Pugh Hall, which includes determining the R and C (resistance/capacitance) parameters in the model (12)-(13) for the zone. The least-squares approach with direct search method described in [16] is used to fit the model parameters. Data collected from the zones during nighttime is used for model calibration to reduce uncertainty of solar radiation and occupant heat gains. The outside air temperature $T_{oa}$ is obtained from historical data [13]. The resulting high-fidelity model of the building has 154 states.

Figure 9:
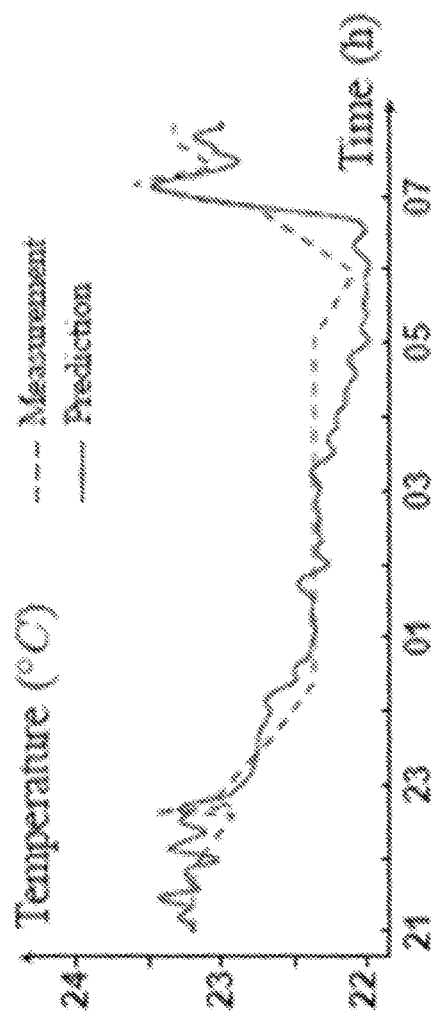
FIG. 9 is a graph illustrating a comparison of zone 1's measured temperature (from Pugh Hall) and prediction using calibrated model (12)-(13).
Figure 10:
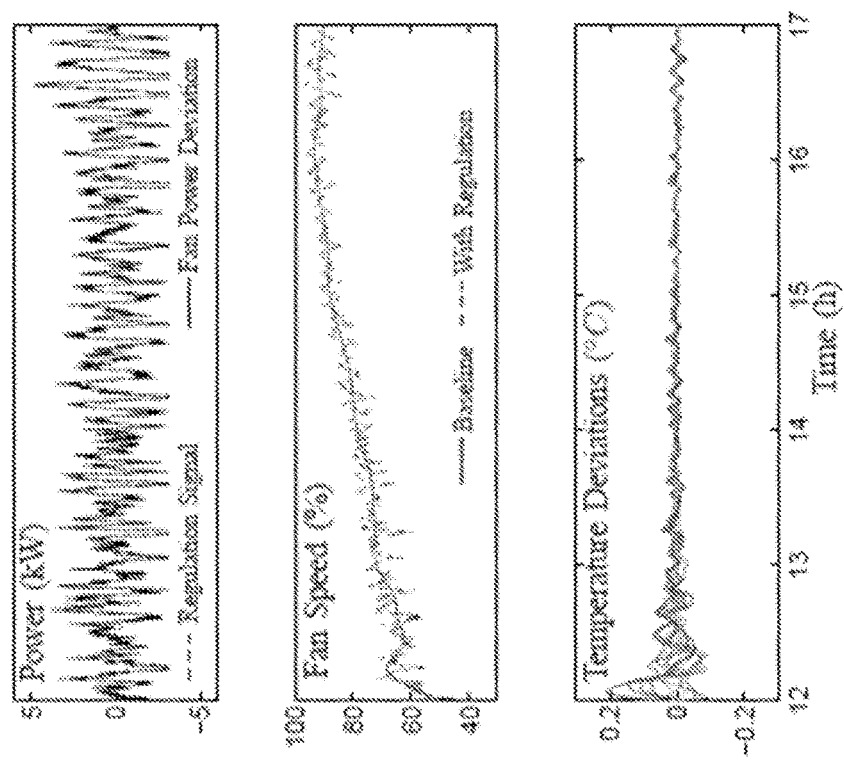
FIG. 10 are graphs illustrating results of a numerical experiment of tracking a regulation signal for a single building. The plots show the regulation signal $r^{filt}$ and fan power deviation $\Delta p$ (top), fan speed with and without regulation (middle), and temperature deviation $\tilde{T}_i$ for each zone (bottom).
Figure 11:
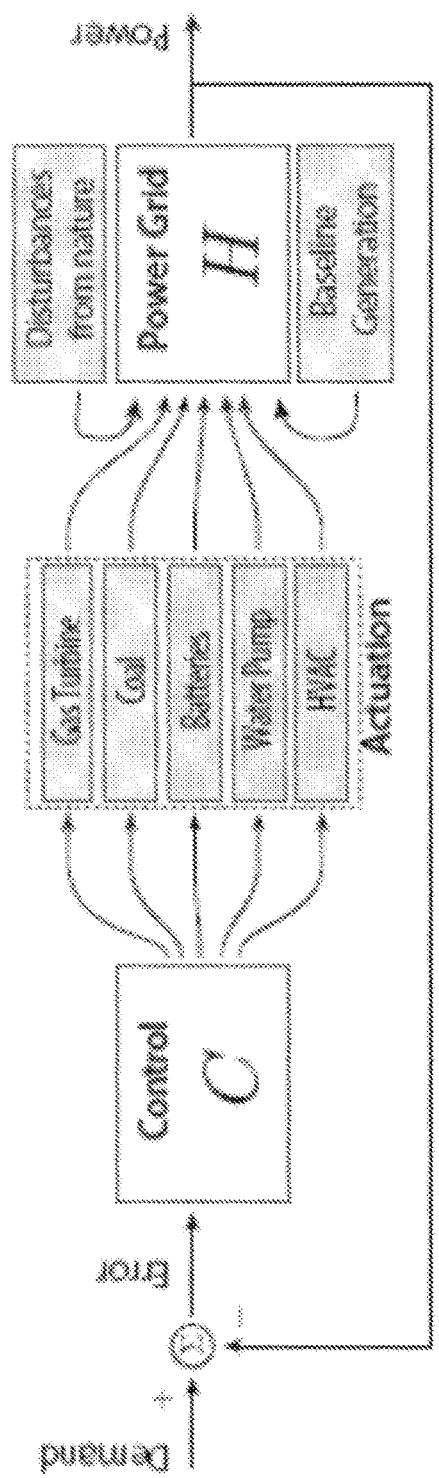
FIG. 11 is a diagram illustrating ancillary services interpreted as actuation in a control system in accordance with some embodiments.

FIG. 9 shows the measured and predicted temperatures for zone 1, where the predictions are obtained from the calibrated high-fidelity model (12)-(13). As shown in FIG. 9, the model predicts well the measured temperature. Similar results are obtained for the other 10 zones.

Further, the inventors performed simulation experiments which test the performance of the regulation controller as described above for tracking a regulation signal by varying power consumption by a fan. The building described above is used for the simulations. The ACE signal r used for constructing the regulation reference r filt for the building is taken from a randomly chosen 5-hr long sample of PJM's ACE (Area Control Error) [8]. It is then scaled so that its magnitude is less than or equal to 5 kW—the regulation capacity of the building. A fifth-order Butterworth filter with passband [1/600, 1/4] Hz is used as the bandpass filter while constructing r filt.

Two simulations were done to determine performance of the control scheme. First, a benchmark simulation is carried out with the regulation controller turned off so that $u^r(t) \equiv 0$. The fan speed is varied only by the building's closed loop control system to cope with the time-varying thermal loads. Then, a second simulation is conducted with the regulation controller turned on and all the exogenous signals (heat gains of the building, outside temperature) are identical to those in the benchmark simulation. The fan power deviation, $\Delta p(t)$, is the difference between the fan power consumption observed in the second simulation and that in the first. FIG. 8 (Top) shows the regulation reference r filt(t) and the actual regulation provided: $\Delta p(t)$. The fan power deviation tracks the regulation signal well. The deviation in the fan speed caused by tracking the regulation signal is depicted in the middle plot. Although the baseline fan speed is time-varying, the regulation controller designed with a constant baseline speed assumption performs well. Finally, the bottom plot depicts the deviation of the temperatures of the individual zones from their set points. The maximum deviation is less than 0.2° C.—a negligible change in the building's indoor environment that may not be noticed by the occupants.

The passband of the bandpass filter may be designed based on additional simulations. The regulation reference signal that can be successfully tracked by the proposed fan speed control mechanism is restricted in a certain bandwidth that is determined by the closed loop dynamics of the building. If the regulation signal contains frequencies lower than 1/600 Hz (corresponding to period of 10 minutes), the zonal controllers compensate for the indoor temperature deviations in the zones by modifying air supply requirements, thus nullifying the speed deviation command of the regulation controller. This results in a poor regulation tracking performance. The upper band limit may be 1/4 Hz to avoid stress on the mechanical parts of the supply fan. In addition, since the ACE data from PJM is sampled every 2 seconds, the detectable frequency content in this data is limited to 1/4 Hz. Thus, the passband of the bandpass filter is chosen as [1/600, 1/4] Hz; cf. FIG. 8.

Regulation Potential of Commercial Buildings in the U.S.

Results of simulation experiments conducted by the inventors show that a single 35 kW supply fan can easily provide about 5 kW capacity of ancillary service to the grid. In Pugh Hall of University of Florida, there are two other AHUs, whose supply fan motors are 25 kW and 15 kW respectively. This indicates that Pugh Hall by itself could provide about 11 kW regulation capacity to the grid. The total available reserves are much higher. There are about 5 million commercial buildings in the U.S., with a combined floor space of approximately 72,000 million sq. ft., of which approximately one third of the floor space is served by HVAC systems that are equipped with VFDs [4]. Assuming fan power density per sq. ft. of all these buildings to be the same as that of Pugh Hall which has an area of 40,000 sq. ft., the total regulation reserves that are potentially available from all the VFD-equipped fans in commercial buildings in the U.S. are approximately 6.6 GW, which is about 70% of the total regulation capacity needed in the United States [5].

Other Embodiments

The time-scale of ancillary service may be extended from commercial building HVAC system to the range 3 minutes to a longer time scale, such as an hour, by using the flexibility in the power demand from chillers. While [32] considers fans as the only source of flexible demand in commercial buildings, chillers are a much larger consumer of electricity, and hence a source of much greater ancillary service.

A key requirement is that indoor climate quality is maintained. This puts a limitation on the frequency band at which ancillary service can be provided. Low frequency deviations in airflow could result in significant temperature variations, depending upon the existing climate controller in the particular building. Typical climate controllers are designed to reject low-frequency temperature deviations. Consequently, low frequency power deviations may instigate the climate controller to reject resulting temperature deviations. The climate quality will be maintained, but the ancillary service will degrade due to the climate control power consumption.

This ambiguity may be resolved if the variation in the regulation reference has zero mean, and sufficiently high frequency.

Frequency and magnitude constraints may be obtained by passing the regulation signal through a bandpass filter. Simulations with a calibrated dynamic model of a building HVAC system demonstrate that the frequency range $\mathscr{F}$ in which the proposed controller can provide ancillary service may be, for example, $\mathscr{F} \triangleq [f_1, f_2]$, where $f_2 \leq 1/(3 \text{ min}) f_2$ and $f_1 \geq 1/(60 \text{ min})$. This range crosses both secondary control (1-10 min) and tertiary control (10 min-hours) [33].

There are a few considerations in designing control algorithms for harnessing ancillary service from commercial building HVAC systems in the time scales of interest in this paper. The first consideration is the complexity of the relevant dynamics of the cooling coil and air flow are. Tashtoush et al. [34] and Huang et al. [35] each propose a model for a VAV HVAC system. However, there are large number of parameters that are hard to obtain accurately. Given the interest in regulation in a restricted frequency range, a simpler model for control may be used. For purposes of illustration, the model was calibrated and validated with field data collected from Pugh Hall in the University of Florida campus.

A second consideration is that there is a transport delay between the change in air flow and the change in power consumption in the chiller, due to the time required for the chilled water to flow from the cooling coil back to the chiller. Reference tracking despite the time delay is achieved by a combination of a Kalman predictor and a Smith Predictor: the Kalman predictor is used to predict the future reference and the Smith predictor is used to ensure closed loop stability in presence of delay. The controller may be designed on a linearized version of the plant, which is a hybrid-nonlinear system.

For purposes of illustrating the approach, simulations show that the proposed control architecture provides high-quality ancillary service, according to the criteria established by PJM [36], while having little impact on indoor climate. Parametric variation studies show that the controller is also robust to potential mismatch between the true value of the transport delay and that used in the design.

Implementation of the Control System

Figure 12:
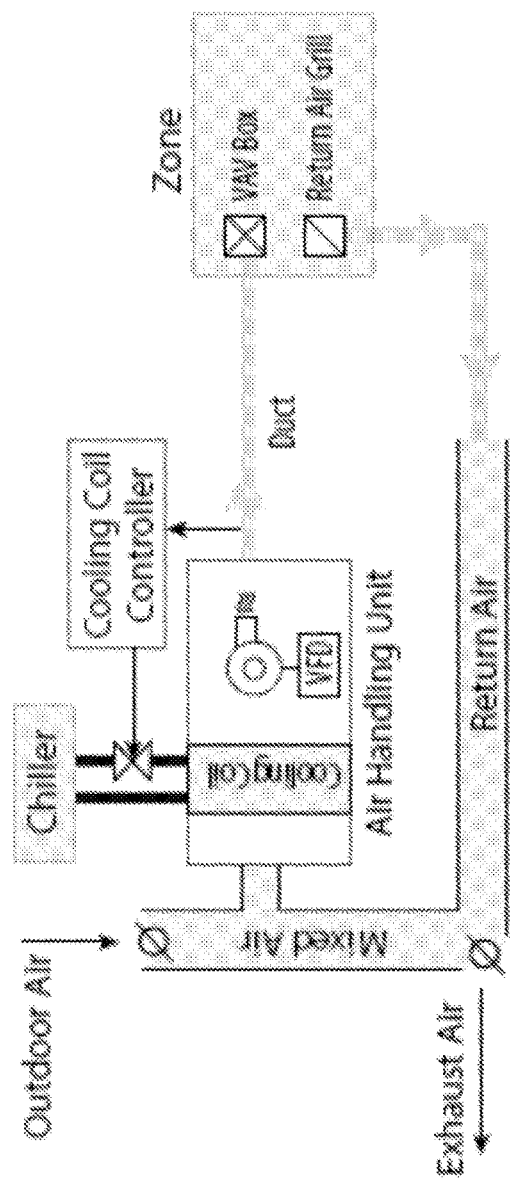
FIG. 12 is a diagram illustrating a typical commercial building VAV HVAC system with a single zone in accordance with some embodiments.

A schematic of an exemplary single-zone VAV HVAC system used in a commercial buildings is shown in FIG. 12. Part of the return air is mixed with outdoor air and sent into the AHU, where it is cooled and dehumidified by passing it across a cooling coil. The conditioned air is then supplied to the zone by a supply air fan. A control system maintains the discharge air temperature at a pre-specified set-point, usually 55° F., by varying the flow rate of chilled water passing through the cooling coil. The inlet temperature of the chilled water into the cooling coil is usually constant, at around 44° F. An indoor climate controller varies the rate of supply airflow to maintain the temperature of the space at a pre-determined setpoint. The power consumption of the chiller is directly affected by variation in the airflow rate since conditioning more air requires more cooling energy.

Our objective is to vary the instantaneous power consumption in chiller and fan to provide ancillary service. In the proposed control architecture, a regulation reference signal, denoted by $\tilde{P}_r$, will be transmitted to each participating building. The ACE (Area Control Error), which indicates the imbalance in the grid [33], may be scaled down by a scaling factor and fed through a bandpass filter to define $\tilde{P}_r$.

A local controller at a building—that is called the regulation controller—may manipulate the supply air flow rate in the building so that the deviation of the instantaneous power consumption from the baseline power tracks the regulation reference signal. "Baseline" value of a variable refers to the counterfactual: the value of the variable due to the actions of the closed loop control system that operates the HVAC system, in the absence of the regulation controller. The reasons for choosing the flow rate of air as the control command are that this variable has a large influence on the power consumption, and it can be easily commanded using the building automation system. However, other suitable parameters may be measured and/or controlled.

Figure 13:
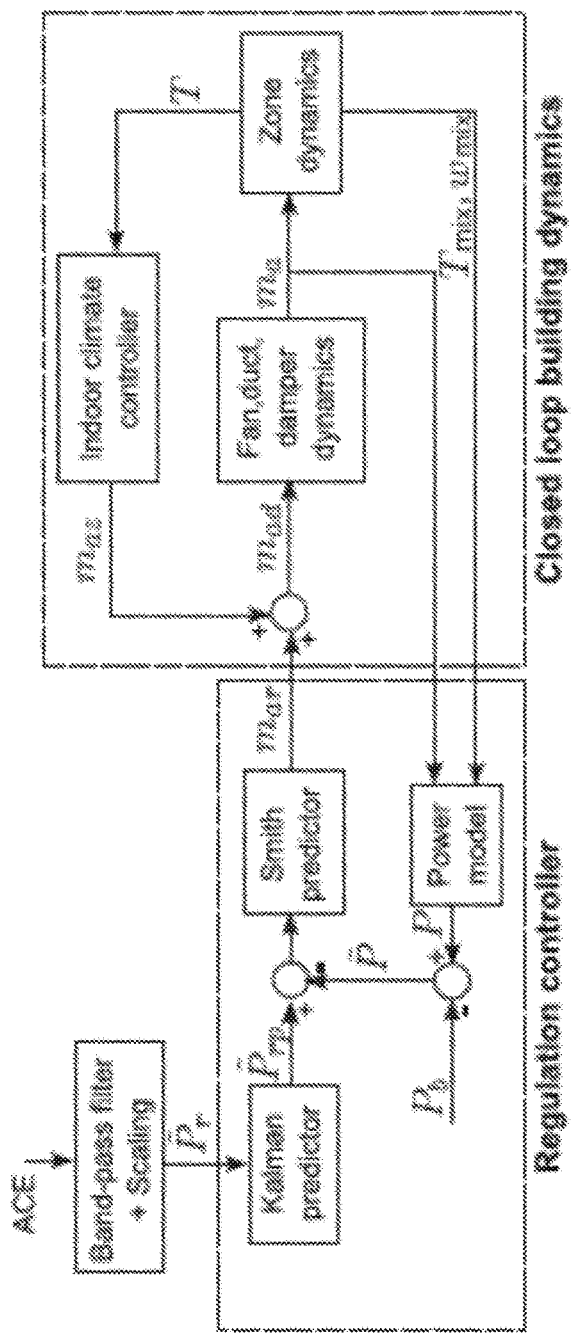
FIG. 13 is a diagram illustrating a proposed control architecture in accordance with some embodiments.

FIG. 13 shows a schematic representation of the signal flow in the proposed control architecture. It should be emphasized that the proposed architecture does not replace the existing building climate controller. It merely modifies the commanded rate of airflow.

Regulation Controller Closed Loop Building Dynamics

The reference signal $\tilde{P}_r(t)$ may be fed into a predictor, such as a Kalman predictor, to predict the future reference signal $\tilde{P}_{rp} = \hat{\tilde{P}}_r(t+t_d)$, where $t_d$ is the transport delay in the chiller power. More detail can be found below. Let $\tilde{P}(t) = P(t) - P_b(t)$ be the deviation of the measured power consumption from the baseline $P_b(t)$. The goal of our regulation controller is to compute the desired additional supply air flow rate $m_{ar}(t)$ which drives $\tilde{P}_{rp}(t) - \tilde{P}(t)$ to 0. The building's existing indoor climate controller computes the desired supply air flow rate $m_{az}(t)$ based on zone temperature. The sum of $m_{ar}(t)$ and $m_{az}(t)$, denoted by $m_{ad}(t)$, is the desired supply flow rate, which is commanded though the BAS. The building's HVAC control system commands the fan and dampers to produce this air flow rate. The actual airflow flow rate $m_a(t)$ is the output of a closed loop control system that depends on the dynamics of the fan controller, damper, and airflow in ducts. Part of the exhaust air from the zone will be mixed with outdoor air in the AHU. The mixed air temperature $T_{mix}(t)$, humidity ratio $w_{mix}(t)$, and mass flow rate $m_a(t)$ determine power $P(t)$ consumed by the chiller and fan.

Building HVAC System Modeling

This section presents an illustrative dynamic model for each part of the HVAC system shown in FIG. 12. Parameter estimation will be discussed below.

Zone Thermal Dynamics

Zone temperature and humidity are the two main state variables of interest in this example. Temperature dynamics can be captured by a RC (resistor-capacitor) circuit analogy [16], [23]. This invention may adopt the 2R-2C model suggested in [16], which is a second order nonlinear system. Dynamics of the zone humidity ratio is one of mass transfer, and is governed by a first order differential equation [23]. The zone thermal dynamics model has 3 states, 8 inputs, and 4 outputs. More model details may be found in [37].

Indoor Climate Controller and Airflow Dynamics

The so-called single-maximum logic is commonly used in commercial buildings to command the airflow so as to maintain the indoor temperature at a pre-determined set point and ensure adequate ventilation. It is a hybrid control logic that includes if-else conditions that determines control "modes" (i.e., when to blow cold air and when to reheat), along with proportional controllers that determine the amount of airflow in each mode. Details may be found in [38] and [39]. Such an approach may be applied in some embodiments.

Once the climate controller computes the desired supply air flow rate, it is transmitted to the fan controller. The fan controller varies the fan speed to deliver the desired air flow rate. The closed loop system may be modeled from the desired supply flow rate $m_a^{ref}$ (input) to actual supply air flow rate $m_a$ (output) to be the first order system, $$m_a(s) = \frac{1/\tau_f}{s+1/\tau_f} m_a^{ref}(s) \quad (14)$$

where $\tau_f$ is the time constant of the system. This time constant aggregates the dynamic effect of the inertia of the fan and dynamics of airflow through ducts.

Cooling Coil Dynamics

Heat and moisture are removed from air at the cooling coil at the air handling unit (AHU). The dynamics of a cooling and dehumidifying coil are complex with many unknown parameters [40], [41]. The idea may be adopted of adding a time constant to a steady state model—as done in [42]—to get a first order dynamical model for the cooling coil. The subscript a may be used for air side, w for water side, 1 for inlet conditions, and 2 for outlet conditions. The inlet and outlet water mass flow rate are the same, i.e., $m_{w1}=m_{w2}=m_w$. The inlet and outlet air mass flow rates are also assumed to be equal since the difference due to water vapor condensation is small, i.e., $m_{a1}=m_{a2}=m_a$. The inputs of the cooling coil are the inlet air and water conditions: $u_{cc}=[T_{a1}, w_{a1}, m_a \cdot T_{w1}, m_w]^T$, outputs are the outlet air and water conditions: $y_{cc}=[T_{a2}, w_{a2}, T_{w2}]^T$.

Suppose the steady state input-output relations are given by $y_{cc}=g(u_{cc})$, $g: \mathbb{R}^5 \to \mathbb{R}^3$, which is determined by the design parameters of the cooling coil. It may be linearized around the design conditions, which are denoted by $u^*_{cc}$ and $y^*_{cc}$. By defining $\tilde{u}_{cc}=u_{cc}-u^*_{cc}$ and $\tilde{y}_{cc}=y_{cc}-y^*_{cc}$ the following may be obtained:

$$\tilde{y}_{cc} \approx J\tilde{u}_{cc}, \, J = \frac{\partial g}{\partial u_{cc}} \bigg|_{u^*_{cc}} \quad (15)$$

Adding a single time constant to the steady state model (15), the cooling coil dynamics can be written as:

$$\tilde{y}_{cc}(s) = \frac{1/\tau_{cc}}{s+1/\tau_{cc}} J\tilde{u}_{cc}(s) \quad (16)$$

where $\tau_{cc}$ is the time constant of the open-loop cooling coil dynamics. Note that the Jacobian J defines the DC gains of the transfer function from $\tilde{u}_{cc}$ to $\tilde{y}_{cc}$.

In practice, the cooling coil may be under closed loop operation; see FIG. 12. The closed loop cooling coil model is obtained by using a PID controller which commands the chilled water flow rate to achieve desired conditioned air temperature. The closed loop cooling coil model is an LTI system with 3 states, 5 inputs and 3 outputs.

Power Consumption

The total power consumed P(t) is the sum of fan power and chiller power: $P(t)=P_f(t)+P_c(t)$. The fan power is related to mass flow rate of air as $P_f=c_f m_a^3$, where $c_f$ is a constant coefficient which can be estimated from data [32].

The cooling and dehumidification of air occurs at the cooling coil, where the chilled water gains heat Q(t) from the air: $Q(t)=m_w(t)C_{pw}(T_{w2}(t)-T_{w1}(t))$. The return water is cooled in the chiller where power is consumed. Due to the transport delay caused by the speed of water flow from the cooling coil to the chiller, which may be located far from the air handling unit, the power consumed by the chiller is $$P_c(t) = \frac{1}{\eta_C} Q_c(t-t_d) \quad (17)$$

where $t_d$ is the delay and $\eta_C$ is the chiller efficiency.

Control Design for Ancillary Service

Two considerations in this regulation controller design are: (i) complex nonlinear hybrid dynamics of the HVAC system; (ii) transport delay in chiller power. Linearizing the system in design phase may tackle (i), and using a Smith predictor [43] and a Kalman predictor [44] may deal with (ii) so that the controller can be designed based on non-delayed system.

Consider the delay free case: $P_{nd}(t)=P_f(t)+Q_c(t)$. Dynamics of all the components of the HVAC system may be combined with $m_{ad}$ as input, $P_{nd}$ as the output, with x denoting the state vector and w denoting the vector of external disturbances, which consists of inputs such as solar heat gain, internal heat gain, and ambient temperature. An equilibrium point ($x^*, m^*_{ad}, w^*$) is chosen, where $m^*_{ad}$ is the nominal mass flow that is observed in normal operation and $w^*$ is the nominal value of all external signals including zone temperature set points, outside weather conditions, etc. The LTI approximation is then obtained by linearization around this equilibrium point:

$$\delta \dot{x} = A\delta x + B\delta m_{ad} + E\delta w$$

$$\delta P_{nd} = C\delta x + D\delta m_{ad} \quad (18)$$

where $\delta x = x - x^*$, $\delta m_{ad} = m_{ad} - m^*_{ad}$, $\delta w = w - w^*$, $\delta P_{nd} = P_{nd} - P^*_{nd}$, and $P^*_{nd}$ is the equilibrium power consumption when $m_{ad}(t) \equiv w^*$. The regulation controller may then be designed as a compensator so that the closed loop sensitivity function $S(j\omega)$ is close to 1 in the frequency range of interest, and small otherwise, so that both reference tracking and disturbance rejection can be achieved.

To design a compensator to handle the transport delay discussed above, a Smith predictor may be used. The delay between mass flow rate change and chiller power consumption can be estimated from the flow rate of chilled water and the geometry and length of the pipe, which is used in the design of the Smith predictor. However, the Smith predictor does not achieve reference tracking. To be able to get reference tracking, a Kalman predictor may be used to predict the reference signal $\hat{t}_d$ time units into the future, i.e., to obtain $\tilde{P}_r(t+\hat{t}_d)$ where $\hat{t}_d$ is the estimated delay in the plant. The Smith predictor operates on the predicted reference so that the closed loop system is guaranteed to achieve reference tracking when $\hat{t}_d = t_d$.

The Kalman predictor uses a double integrator model of the process, with the first state being the reference signal, and the output being the reference signal corrupted by noise. The idea behind the model is that since the reference signal is smooth, it changes at an approximately constant rate in short time intervals. The continuous dynamics is first discretized, a standard Kalman predictor is then used to calculate the reference signal n-steps into the future [44]:

$$\tilde{P}_r(k+n) = C_0 A^n \hat{x}(k|k) \quad (19)$$

where $C_0=[1,0]$ is the output matrix, $\hat{x}(k|k)$ is the state estimated at time k by the Kalman filter.

Figure 14:
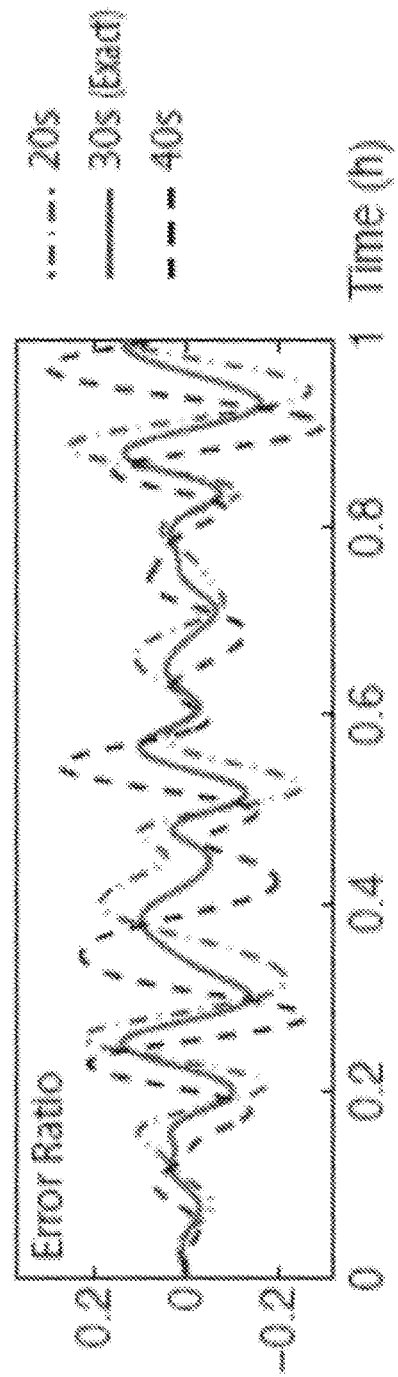
FIG. 14 is a graph illustrating a comparison of prediction errors of regulation reference signal $\hat{P}_r$ when there is a mismatch between the true delay and delay used in the Kalman predictor in accordance with some embodiments.

The accuracy of prediction depends on the bandwidth of the input and the delay. The reference signal $\tilde{P}_r$ is restricted to a frequency range $\mathscr{F}$ by bandpass filtering the ACE signal. The delay is estimated to be 30 s for an on-site chiller in Pugh Hall. The inventors ran the simulation with different delays, and it turned out the prediction error is reasonable up to 90 s of delay. In reality, accurate knowledge of the delay may not be available. The inventors studied the effect of this uncertainty on prediction accuracy by performing simulations in which the true delay is 30 s but the Kalman predictor uses a delay estimate of 20 s and 40 s, respectively. The results are shown in FIG. 14, where the error ratio in the figure is defined as the ratio of prediction error to root mean square of the reference signal. The result shows that delay mismatch increases the prediction error, as expected, but not by a lot. Although the error appears to be large at some instances, it occurs when the magnitude of the reference signal is small. The effect of this error on reference tracking is further discussed below, which shows that the resulting error in reference prediction is acceptable.

Simulation Study

In this section, an example is presented.

Simulation Setup

The subsystems described in III were integrated together and implemented in Simulink. Field data was collected from Pugh Hall on University of Florida campus to estimate parameters in the model. Data from AHU-2 may be used in the building, which is used as a dedicated AHU for a large auditorium that is 22 ft. high with floor area 6000 sq. ft., and can hold more than 200 occupants.

Figure 15:
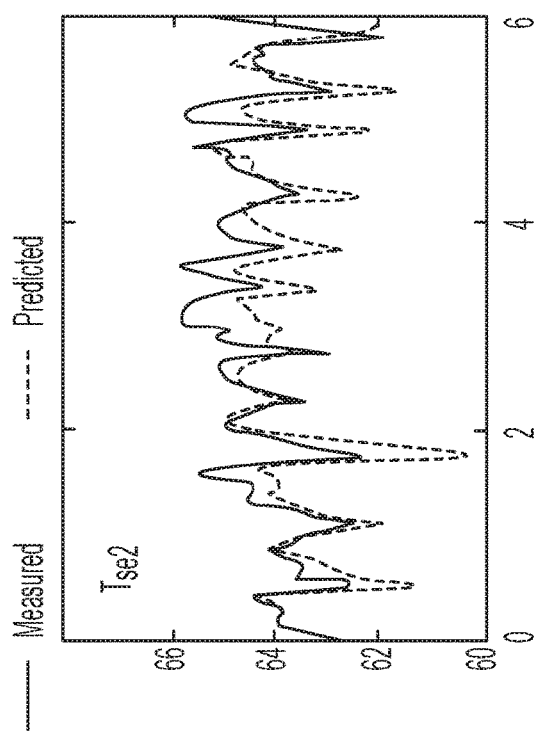
FIG. 15 are graphs illustrating zone climate model (left) and cooling coil model (right) validation in accordance with some embodiments.
Figure 15:
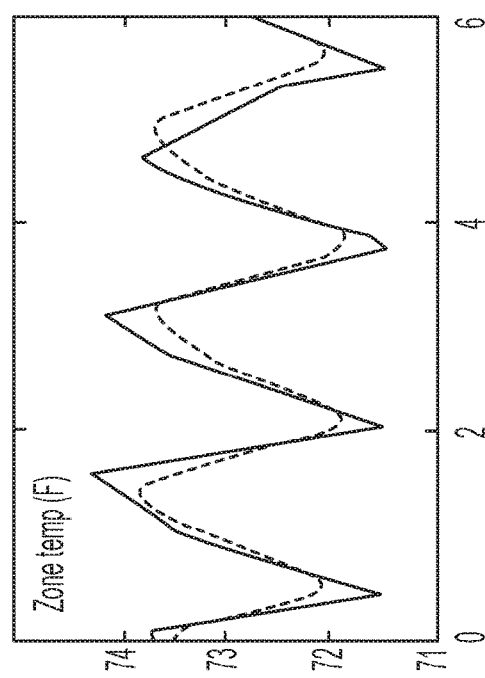

Zone parameters are estimated using the method in [16]. The measured zone temperature and the temperature predicted by the model are shown in FIG. 15 (left).

To estimate J in the cooling coil model, a particular coil model may be picked that resembles the coil in AHU2 of Pugh Hall. For a given inlet conditions, the outlet conditions are obtained from Daikin McQuay Tools Suite [45]. The Jacobian is then estimated numerically. The outlet conditions predicted by the model and the measured outlet conditions are shown in FIG. 15. Due to lack of space, only return chilled water temperature $T_{w2}$ is shown. It can be seen from the figure that our model predicts $T_{w2}$ well with a maximum prediction error less than 2° F.

Other parameter values are available in [37]. The baseline power $P_b$ is obtained by simulating the system without the frequency regulation controller. A profile of exogenous inputs, including ambient environment and solar and internal heat gain, are specified for the simulation. The values in the profile are chosen based on the location, construction, and schedule of Pugh Hall.

Performance Metrics

Performance of the control architecture depends on (i) how much ancillary service is provided through regulation reference tracking, and (ii) how much deviation of the indoor climate from the baseline conditions occur as a result of the controller's actions.

Measuring regulation reference tracking is somewhat involved because of the way ancillary service is evaluated by ISOs. Traditionally, once certified, the frequency regulation service providers are usually compensated by capacity, not performance. However, this is unfair to those who provide faster or more accurate response. FERC order No. 755 [46] stressed this problem and asked RTOs and ISOs to design performance-based compensation in their tariff. The performance score may be defined by PJM [36].

The score contains three parts: $S_c$—the correlation score, $S_d$—the delay score, and $S_p$—the precision score. $S_c$ and $S_d$ are used to quantify the delay between the regulation signal and the response of the resource. Define the correlation coefficient to be:

$$R_P(\tau) = \frac{\text{cov}(\tilde{P}_r(t), \tilde{P}(t+\tau))}{\sigma_{\tilde{P}_r(t)} \sigma_{\tilde{P}(t+\tau)}} \quad (20)$$

where $\sigma$ is the standard deviation of the signal. The parameter $\tau^*$ is defined as the time shift with which the response has the highest correlation with the reference signal:

$$\tau^* = \underset{\tau \in [0.5 \text{ mins}]}{\arg \max} R_P(\tau) \quad (21)$$

The scores $S_c$ and $S_d$ are then determined as:

$$S_c = R_P(\tau^*), S_d = \left|\frac{\tau^* - 5 \text{ mins}}{5 \text{ mins}}\right| \quad (22)$$

The precision score $S_p$ is defined as:

$$S_p = 1 - \frac{1}{n}\sum_{i=1}^{n} \frac{|P(i) - P_r(i)|}{|P_{r,a}|} \quad (23)$$

where $P_{r,a}$ is the hourly average of the reference signal, n is the number of samples. The total performance score $S_t$ is the average of the three parts, i.e., $$S_t = \frac{1}{3}S_c + \frac{1}{3}S_d + \frac{1}{3}S_p.$$

Results

ACE data from PJM is used as the regulation signal. The scaling factor was determined first. If the scaling factor is too large, the supply air flow rate has large oscillation, which is undesirable. First, it will violate the outdoor air requirement for indoor air quality when the supply flow rate becomes too low. Second, the oscillation increases wear and tear of the equipment. The oscillation may be evaluated by comparing the variation from the baseline supply flow rate. More precisely, $$v = \frac{1}{n}\sum_{i=1}^{n} \frac{|m_a(i) - m_{a,b}(i)|}{m_{a,b}(i)} \quad (24)$$

where $m_a$ is the supply flow rate with the regulation controller, $m_{a,b}$ is the supply air flow rate of the baseline case. The scaling factor may be $4 \times 10^{-5}$, in which case v=15%.

Figure 16A:
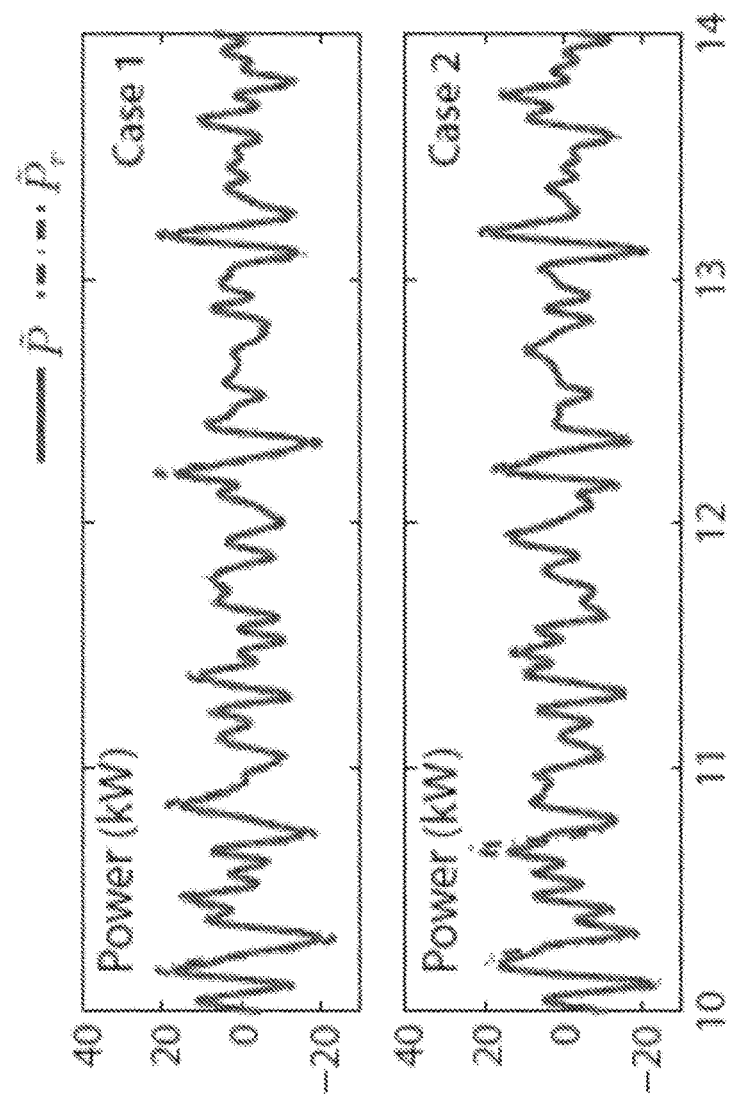
FIG. 16 are graphs illustrating performance of the regulation controller in accordance with some embodiments.
Figure 16B:
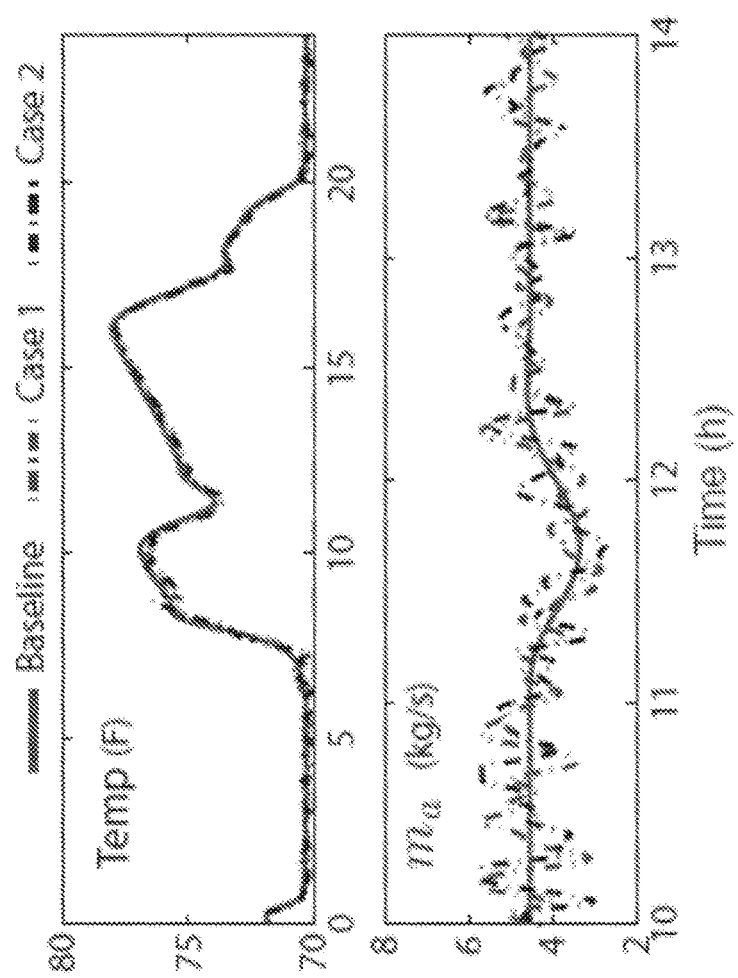

The reference tracking results for two cases are shown in FIG. 16. The bandpass filter for the ACE signal is designed to have a passband of 3 to 30 minutes in case 1, and 3 to 60 minutes in case 2. FIG. 16 shows that in both cases it may be possible to track the reference signal with maximum power of about 20 kW. The temperature deviation from baseline case is larger in Case 2 than in Case 1, but both are less than 1° F. The maximum temperature deviation $\Delta T_{max}$ (° F.) and performance score $S_t$ are shown in Table I. The performance score is computed for each hour in a 12-hour duration, and then averaged. PJM require the provider to reach a score of 0.75 to be qualified for frequency regulation market. The present controller performs well above the requirement.

TABLE I

PERFORMANCE VS. REFERENCE FREQUENCY.

| Time scale (min) | $S_c$ | $S_d$ | $S_p$ | $S_t$ | $\Delta T_{max}$ (° F.) |
|---|---|---|---|---|---|
| 1 to 3 | 0.67 | 0.85 | −0.95 | 0.50 | 0.24 |
| 3 to 10 | 0.96 | 1 | 0.82 | 0.93 | 0.10 |
| 10 to 30 | 0.96 | 1 | 0.81 | 0.92 | 0.44 |
| 30 to 60 | 0.95 | 0.95 | 0.80 | 0.90 | 1.69 |
| 3 to 30 (Case 1) | 0.96 | 1 | 0.81 | 0.92 | 0.40 |
| 3 to 60 (Case 2) | 0.96 | 0.98 | 0.79 | 0.91 | 0.87 |

The algorithm with reference signals of different frequency ranges by varying the passband $\mathscr{F}$ of the bandpass filter was also tested. The results are shown in Table I. The controller operated according to the lower frequency embodiment does not work well for high frequency range (1 to 3 minutes), but, in some embodiments, higher frequency embodiments as described may be used with regulation signals in this frequency range. Since the time constant of the chiller falls in that range, it cannot react fast enough to track the reference signal. The tracking performance of the middle and low frequency ranges are both good. However, the zone temperature variation from the baseline case grows as the reference signal becomes slower. That is because of the attempt to over-condition or under-condition the zone for longer times, which drives the temperature away from the desired value.

The effect of chiller power delay mismatch on tracking performance was also studied in simulation. The true delay of the system is 30 s. Table II shows the performance of the controller when it is designed assuming the delay is 15 s and 45 s, respectively. As shown in the table, in both cases, the effect of chiller delay mismatch on the delay score $S_d$ is small. In the 45 s case, the precision score $S_p$ is worse compared to the case when accurate delay knowledge is used, but it is still acceptable. With this given model and reference signal, the present control strategy is able to handle 50% of delay mismatch in both directions.

TABLE II

EFFECT OF DELAY MISMATCH IN CHILLER POWER.

| True Delay (s) | Delay in design (s) | $S_c$ | $S_d$ | $S_p$ | $S_t$ |
|---|---|---|---|---|---|
| 30 | 15 | 0.95 | 1 | 0.84 | 0.93 |
| 30 | 45 | 0.97 | 0.99 | 0.79 | 0.92 |

The simulation results show that AHU2 in Pugh Hall, which has a rated cooling capacity of 97.5 kW, could provide 20 kW of ancillary service. The total regulation capacity of Pugh Hall (40, 000 sq. ft.) that has two other AHUs is estimated to be 100 kW. In the U.S., the total floor area of commercial buildings is about 72,000 million square feet, about 30% of which is served by VAV systems [4]. Assuming that the cooling power density (kW per sq. ft.) is similar among these buildings, the commercial building sector could provide 12 GW of regulation service, which is more than the total regulation capacity required in the U.S., which is about 10 GW [5].

REFERENCES

The following references are incorporated herein by reference in their entireties:
[1] Callaway, D. S. and Hiskens, I. A. Achieving controllability of electric loads. *Proceedings of the IEEE*, 99(1): 184-199, 2011.
[2] Agricultural Demand Response Program in California Helps Farmers Reduce Peak Electricity Usage, Operate More Efficiently Year-Round.
[3] Buildings Energy Data Book.
[4] Commercial Buildings Energy Consumption Survey (CBECS): Overview of Commercial Buildings, 2003. Technical report, Energy information administration, Department of Energy, U.S. Govt., 2008.
[5] Eyer, J. and Corey, G. Energy storage for the electricity grid: Benefits and market potential assessment guide. *Sandia National Laboratories Report, SAND*2010-0815, Albuquerque, N. Mex., 2010.
[6] Koch, S. and Mathieu, J. and Callaway, D. Modeling and control of aggregated heterogeneous thermostatically controlled loads for ancillary services. *Proc. PSCC*, pages 1-7, 2011.
[7] Soumya Kundu and Nikolai Sinitsyn and Scott Backhaus and Ian Hiskens. Modeling and control of thermostatically controlled loads. *Arxiv preprint arXiv:*1101.2157, 2011.
[8] PJM Regulation Data.
[9] PJM Regulation Market Clearing Price.
[10] Braun, J. E. Reducing energy costs and peak electrical demand through optimal control of building thermal storage. *ASHRAE transactions*, 96(2):876-888, 1990.
[11] Mathieu, J. L. and Callaway, D. S. State Estimation and Control of Heterogeneous Thermostatically Controlled Loads for Load Following. 2012 *45th Hawaii International Conference on System Sciences*, pages 2002-2011, 2012. IEEE.
[12] Todd, D. W. and Caufield, M. and Helms, B. and Generating, A. P. and Starke, I. M. and Kirby, B. and Kueck, J. Providing Reliability Services through Demand Response: A Preliminary Evaluation of the Demand Response Capabilities of Alcoa Inc. *ORNL/TM*, 233, 2008.
[13] Weather Underground.
[14] Braun, J. E. and Kim, D. and Baric, M. and Li, P. and Narayanan, S. and Yuan, S. and Cliff, E. and Burns, J. A. and Henshaw, B. Whole Building Control System Design and Evaluation: Simulation-Based Assessment. 2012.
[15] Eric Hirst and Brendan Kirby. Electric Power Ancillary Services. Technical report, ORNLCON-426, Oak Ridges National Laboratory, Oak Ridge, Tenn., 1996.
[16] Yashen Lin and Prabir Barooah. Issues in identification of control-oriented thermal models of zones in multi-zone buildings. *IEEE Conference on Decision and Control*, 2012.
[17] Makarov, Y. V. and Lu. S. and Ma, J. and Nguyen, T. B. Assessing the Value of Regulation Resources Based on Their Time Response Characteristics. Technical report, PNNL-17632, Pacific Northwest National Laboratory, Richland, W A, 2008.
[18] Makarov, Y. V. and Loutan, C. and Jian Ma and de Mello, P. Operational Impacts of Wind Generation on California Power Systems. *IEEE Transactions on Power Systems*, 24(2):1039-1050, 2009.

[19] Smith, J. C. and Milligan, M. R. and DeMeo, E. A. and Parsons, B. Utility Wind Integration and Operating Impact State of the Art. *IEEE Transactions on Power Systems*, 22(3):900-908, 2007.

[20] Khoi Vu and Masiello, R. and Fioravanti, R. Benefits of fast-response storage devices for system regulation in ISO markets. *IEEE Power Energy Society General Meeting, 2009*, pages 1-8, 2009.

[21] First 'Small Scale' Demand-side Projects in PJM Providing Frequency Regulation. http://www.sacbee.com/2011/11/21/v-print/4070973/first-small-scale-demand-side.html, 2011.

[22] ASHRAE. The ASHRAE Handbook HVAC Systems and Equipment (SI Edition). 2008.

[23] Siddharth Goyal and Prabir Barooah. A Method for Model-Reduction of Nonlinear Building Thermal Dynamics of Multi-Zone Buildings. *Energy and Buildings*, 47:332-340, 2012.

[24] Meyn, S. and Negrete-Pincetic, M. and Gui Wang and Kowli, A. and Shafieepoorfard, E. The value of volatile resources in electricity markets. *CDC2010*, pages 1029-1036, 2010. And submitted to IEEE TAC, 2012.

[25] Schweppe, F. C. and Tabors, R. D. and Kirtley, J. L. and Outhred, H. R. and Pickel, F. H. and Cox, A. J. Homeostatic Utility Control. *IEEE Transactions on Power Apparatus and Systems*, PAS-99(3):1151-1163, 1980.

[26] Paul Steffes. Grid-Interactive Renewable Water Heating: Analysis of the Economic and Environmental Value..steffes.com/LiteratureRetrieve.aspx?ID=72241.

[27] Xu, P. and Haves, P. and Piette, M. A. and Braun, J. Peak demand reduction from pre-cooling with zone temperature reset in an office building. 2004.

[28] Callaway, D. S. "Tapping the energy storage potential in electric loads to deliver load following and regulation, with application to wind energy," *Energy Conversion and Manage.*, vol. 50, no. 5, pp. 1389-1400, 2009.

[29] Mathieu, J. L. "Modeling, analysis, and control of demand response resources," Ph.D. dissertation, University of California, Berkeley, 2012.

[30] Keeney, K. R. and Braun, J. E. "Application of building precooling to reduce peak cooling requirements," ASHRAE transactions, vol. 103, no. 1, pp. 463-469, 1997.

[31] Kiliccote, S., Piette, M. A. and Hansen, D. "Advanced controls and communications for demand response and energy efficiency in commercial buildings," 2006.

[32] Hao, H., Kowli, A. Lin, Y. Barooah, P. and Meyn, S. "Ancillary service for the grid via control of commercial building HVAC systems," in American Control Conf., 2013, accepted.

[33] NERC Resources Subcommittee, "Blancing and frequency control," North American Electric Reliability Corporation, Tech. Rep., 2011.

[34] Tashtoush, B., Molhim, M. and Al-Rousan, M. "Dynamic model of an HVAC system for control analysis," Energy, vol. 30, no. 10, pp. 1729-1745, 2005.

[35] Huang, W. Z. Zaheeruddin, M. and Cho, S. "Dynamic simulation of energy management control functions for HVAC systems in buildings," Energy Conversion and Manage., vol. 47, pp. 926-943, 2006.

[36] PJM, "PJM manual 12: Balancing operations, rev. 27," December 2012.

[37] Lin, Y., Meyn, S. and Barooah, P. "Commercial building HVAC system in power grid ancillary services," http://plaza.ufl.edu/yashenlin, University of Florida, Tech. Rep., 2013.

[38] American Society of Heating, Refrigerating and Air Conditioning Engineers, "The ASHRAE handbook fundamentals (SI Edition)," 2005.

[39] Goyal, S., Ingley, H. and Barooah, P. "Occupancy-based zone climate control for energy efficient buildings: Complexity vs. performance," Applied Energy, vol. 106, pp. 209-221, June 2013.

[40] Zhou X. and Braun, J. E. "A simplified dynamic model for chilled-water cooling and dehumidifying coils Part 1: Development (RP-1194)," HVAC&R Research, vol. 13, no. 5, pp. 785-804, 2007.

[41] Yao, Y., Lian, Z. and Hou, Z. "Thermal analysis of cooling coils based on a dynamic model," Applied thermal engineering, vol. 24, no. 7, pp. 1037-1050, 2004.

[42] Elmandy, A. and Mitalas, G. "A simple model for cooling and dehumidifying coils for use in calculating energy requirements for buildings," ASHRAE transactions, vol. 83, no. 2, pp. 103-117, 1977.

[43] Ogunnaike, B. A. and Ray, W. H. Process dynamics, modeling, and control. Oxford University Press New York, 1994.

[44] Rhodes, I. B. "A tutorial introduction to estimation and filtering," IEEE Transaction on Automatic Control, vol. AC-16, no. 6, 1971.

[45] Daikin Industries, "Daikin McQuay Tools Suite," http://www.daikinmcquay.com/McQuay/DesignSolutions/McQuayToolsEngineers.

[46] Federal Energy Regulatory Commission, "Order No. 755 Frequency Regulation Compensation in the Wholesale Power Markets: Comments of ISO/RTO Council," May 2011.

Computing Environment

Figure 17:
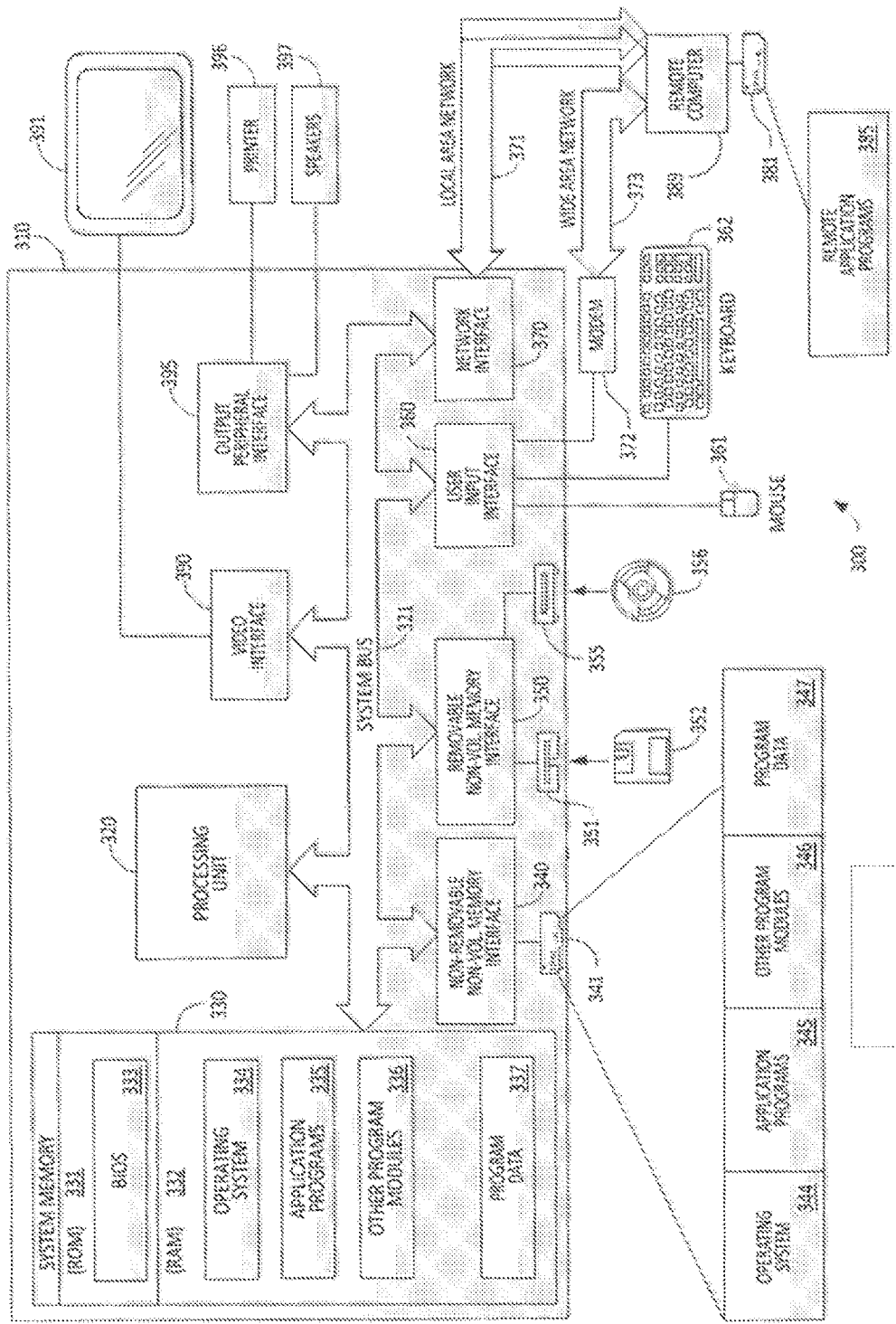
FIG. 17 is a diagram illustrating a computer system on which some embodiments of the invention may be implemented.

Control techniques to generate or use a regulation system at a customer premises may be implemented on any suitable hardware, including a programmed computing system. FIG. 17 illustrates an example of a suitable computing system environment 300 on which embodiments the invention may be implemented. This computing system may be representative of a computing system that implements the described technique of providing ancillary services to a power grid using a customer premises. However, it should be appreciated that the computing system environment 300 is only one example of a suitable computing environment and is not intended to suggest any limitation as to the scope of use or functionality of the invention. Neither should the computing environment 300 be interpreted as having any dependency or requirement relating to any one or combination of components illustrated in the exemplary operating environment 300.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments or cloud-based computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 17, an exemplary system for implementing the invention includes a general purpose computing device in the form of a computer 310. Components of computer 310 may include, but are not limited to, a processing unit 320, a system memory 330, and a system bus 321 that couples various system components including the system memory to the processing unit 320. The system bus 321 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 310 typically includes a variety of computer readable media. Computer readable media can be any available media that can be accessed by computer 310 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 310. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of the any of the above should also be included within the scope of computer readable media.

The system memory 330 includes computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during start-up, is typically stored in ROM 331. RAM 332 typically contains data and/or program modules that are immediately accessible to and/or presently being operated on by processing unit 320. By way of example, and not limitation, FIG. 17 illustrates operating system 334, application programs 335, other program modules 336, and program data 337.

The computer 310 may also include other removable/non-removable, volatile/nonvolatile computer storage media. By way of example only, FIG. 17 illustrates a hard disk drive 341 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 is typically connected to the system bus 321 through an non-removable memory interface such as interface 340, and magnetic disk drive 351 and optical disk drive 355 are typically connected to the system bus 321 by a removable memory interface, such as interface 350.

The drives and their associated computer storage media discussed above and illustrated in FIG. 17, provide storage of computer readable instructions, data structures, program modules and other data for the computer 310. In FIG. 17, for example, hard disk drive 341 is illustrated as storing operating system 344, application programs 345, other program modules 346, and program data 347. Note that these components can either be the same as or different from operating system 334, application programs 335, other program modules 336, and program data 337. Operating system 344, application programs 345, other program modules 346, and program data 347 are given different numbers here to illustrate that, at a minimum, they are different copies. A user may enter commands and information into the computer 310 through input devices such as a keyboard 362 and pointing device 361, commonly referred to as a mouse, trackball or touch pad. Other input devices (not shown) may include a microphone, joystick, game pad, satellite dish, scanner, or the like. These and other input devices are often connected to the processing unit 320 through a user input interface 360 that is coupled to the system bus, but may be connected by other interface and bus structures, such as a parallel port, game port or a universal serial bus (USB). A monitor 391 or other type of display device is also connected to the system bus 321 via an interface, such as a video interface 390. In addition to the monitor, computers may also include other peripheral output devices such as speakers 397 and printer 396, which may be connected through a output peripheral interface 395.

The computer 310 may operate in a networked environment using logical connections to one or more remote computers, such as a remote computer 380. The remote computer 380 may be a personal computer, a server, a router, a network PC, a peer device or other common network node, and typically includes many or all of the elements described above relative to the computer 310, although only a memory storage device 381 has been illustrated in FIG. 17. The logical connections depicted in FIG. 17 include a local area network (LAN) 371 and a wide area network (WAN) 373, but may also include other networks. Such networking environments are commonplace in offices, enterprise-wide computer networks, intranets and the Internet.

When used in a LAN networking environment, the computer 310 is connected to the LAN 371 through a network interface or adapter 370. When used in a WAN networking environment, the computer 310 typically includes a modem 372 or other means for establishing communications over the WAN 373, such as the Internet. The modem 372, which may be internal or external, may be connected to the system bus 321 via the user input interface 360, or other appropriate mechanism. In a networked environment, program modules depicted relative to the computer 310, or portions thereof, may be stored in the remote memory storage device. By way of example, and not limitation, FIG. 17 illustrates remote application programs 385 as residing on memory device 381. It will be appreciated that the network connections shown are exemplary and other means of establishing a communications link between the computers may be used.

Having thus described several aspects of at least one embodiment of this invention, it is to be appreciated that various alterations, modifications, and improvements will readily occur to those skilled in the art.

Although examples of power consumption components regulated in accordance with some embodiments to provide ancillary services to a power grid include fans in commercial buildings, various other components of a commercial building may be utilized to provide the ancillary services. For example, additionally or alternatively, one or more chillers may be utilized. Furthermore, combinations of power consumption components may be utilized for providing ancillary services to a grid, such as a combination of at least one fan and at least one chiller. Combinations of any other power consumption components may be used as well.

Such other power consumption components may have a low-frequency response to modulation of a control signal and likewise may be controlled using one or more predictors as described herein.

Also, ancillary services to a power grid may be provided by controlling dispatch of distributed energy resources by commercial buildings that have on-site distributed generation capability.

Furthermore, various other sources of ancillary services may be utilized, such as, for example, pool pumps. As another example, batteries and other sources may be used to address regulation at very high frequencies. At ultra-low frequencies, flexible manufacturing (e.g., desalination and aluminum manufacturing) may be used for providing ancillary services.

Such alterations, modifications, and improvements are intended to be part of this disclosure, and are intended to be within the spirit and scope of the invention. Further, though advantages of the present invention are indicated, it should be appreciated that not every embodiment of the invention will include every described advantage. Some embodiments may not implement any features described as advantageous herein and in some instances. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of providing ancillary services to a power grid using a customer premises comprising at least one power consumption component, the method comprising:
   receiving a regulation signal; and
   based on the received regulation signal, modifying at least one operating parameter of a single power consumption component so that a projected power consumption by the single power consumption component is changed in accordance with a projection of the received regulation signal,
   wherein the regulation signal is associated with an ancillary service for the power grid and indicates a change in power consumption at the customer premises to implement the ancillary service.

2. The method of claim 1, wherein the regulation signal is specific to the customer premises.

3. The method of claim 1, wherein the ancillary service comprises frequency regulation of the power grid or load following on the power grid.

4. The method of claim 1, wherein the regulation signal has primary frequency components indicative of changes in power consumption over a time in a range from 4 seconds to 10 minutes, from 4 seconds to 20 minutes, from 3 minutes to 60 minutes, or from 3 minutes to 120 minutes.

5. The method of claim 1, wherein the single power consumption component comprises one component of a Heating, Ventilation, and Air Conditioning system in a commercial building at the customer premises.

6. The method of claim 1, wherein the single power consumption component comprises one fan, and the at least one operating parameter comprises speed of the one fan.

7. The method of claim 1, wherein the single power consumption component comprises one chiller, and the at least one operating parameter comprises air flow rate through the customer premises.

8. The method of claim 1, wherein:
   the method further comprises receiving at least one control input indicating an operating state of the single power consumption component; and
   modifying the at least one operating parameter comprises computing the at least one operating parameter based on at least one of:
      the regulation signal and the control input, or
      at least one predictor predicting the regulation signal and/or on the control input.

9. The method of claim 1, wherein:
   the customer premises is a commercial building; and
   the power consumption by the single power consumption component is changed so that a temperature in the commercial building changes by no more than 1 degree Celsius or by no more than 0.2 degrees Celsius relative to a user specified temperature.

10. The method of claim 1, wherein:
    the change in power consumption at the customer premises to implement the ancillary service comprises a change to compensate for a mismatch between load in the power grid and power generation capacity in the power grid; and
    the method further comprises:
       modifying the at least one operating parameter so that the power consumption by the single power consumption component increases or decreases based on the change to compensate for the mismatch.

11. A method of providing ancillary services to a power grid using a customer premises comprising at least one power consumption component, the method comprising:
    receiving a regulation signal;
    determining primary frequency components of the regulation signal; and
    based on the primary frequency components, selecting at least one operating parameter of a single power consumption component and adjusting the at least one selected operating parameter so that power consumption by the single power consumption component is changed in accordance with the received regulation signal, wherein the regulation signal has primary frequency components indicative of variations in power consumption over a time ranging from 4 seconds to 120 minutes.

12. The method of claim 11, wherein the regulation signal is specific to the customer premises.

13. The method of claim 11, wherein:
    the method comprises establishing a first operating point of the single power consumption component, the first operating point being selected to be a fraction of a rated power for the single power consumption component; and adjusting the at least one operating parameter of the single power consumption component comprises increasing or decreasing power consumption of the single consumption component in accordance with the received regulation signal so as to provide an ancillary service to the power grid.

14. The method of claim 13, wherein the ancillary service comprises frequency regulation of the power grid or load following on the power grid.

15. The method of claim 11, wherein the single power consumption component comprises one component of a Heating, Ventilation, and Air Conditioning system in the commercial building.

16. The method of claim 11, wherein the single power consumption component comprises one fan, and the at least one operating parameter comprises speed of the at least one fan.

17. The method of claim 11, wherein the single power consumption component comprises one chiller, and the at least one operating parameter comprises air flow rate through the customer premises.

18. The method of claim 11, wherein:
the regulation signal is associated with an ancillary service for the power grid and indicates a change in power consumption at the customer premises to implement the ancillary service;
the change in power consumption at the customer premises to implement the ancillary service comprises a change to compensate for a projected mismatch between load in the power grid and power generation capacity in the power grid; and
the method further comprises:
modifying the at least one operating parameter so that the power consumption by the single power consumption component increases or decreases based on the projected change to compensate for the mismatch.

19. The method of claim 11, wherein:
the method further comprises receiving at least one control input indicating an operating state of the single power consumption component; and
adjusting the at least one operating parameter comprises computing the at least one operating parameter based on the regulation signal and the control input.

20. The method of claim 11, wherein:
the method further comprises receiving at least one control input indicating an operating state of the single power consumption component; and
adjusting the at least one operating parameter comprises computing the at least one operating parameter based on at least one predictor predicting the regulation signal and/or on the control input.

21. The method of claim 11, wherein:
the customer premises is a commercial building; and
the power consumption by the single power consumption component is changed so that a temperature in the commercial building changes by no more than 1 degree Celsius or by no more than 0.2 degrees Celsius relative to a user specified temperature.

22. A method for operating a power grid, the method comprising:
determining an amount of load to be adjusted in the power grid;
allocating to each facility of a plurality of facilities an adjustment in power consumption to achieve a load adjustment based on the determined amount; and
transmitting a plurality of regulation signals to the plurality of facilities,
wherein each regulation signal of the plurality of regulation signals transmitted to the facility indicates the adjustment in power consumption allocated to the facility.

23. The method of claim 22, wherein:
the adjustment in power consumption allocated to the facility is based on the determined amount of load to be adjusted and a capability of the facility; and
the capability of the facility comprises a capability to modify at least one operating parameter of single power consumption component in the facility so that power consumption by the single power consumption component is changed in accordance with the regulation signal.

24. The method of claim 23, wherein:
the adjustment is further based on at least one predictor predicting the regulation signal.

25. The method of claim 22, wherein:
the facility comprises at least one commercial building.

26. The method of claim 22, wherein:
determining comprises:
measuring in real time an imbalance between power generated on the power grid and load on the power grid, and
updating the determined amount of load to be adjusted in real time so as to compensate for the imbalance.

27. An apparatus for controlling at least one power consumption component to provide an ancillary service to a power grid, the apparatus comprising:
circuitry configured to:
receive a regulation signal associated with the ancillary service for the power grid;
receive input indicating at least one operating parameter of a single power consumption component; and
generate a control signal for the single power consumption component such that the at least one operating parameter of the single power consumption component is changed in accordance with the input and the received regulation signal to control power consumption of the single power consumption component in accordance with the ancillary service.

28. The apparatus of claim 27, wherein:
the input is derived from a control input specifying an operation of the single power consumption component.

29. The apparatus of claim 27, wherein:
the at least one operating parameter of the single power consumption component is further changed in accordance with at least one predictor predicting the regulation signal.

30. The apparatus of claim 27, wherein:
the apparatus further comprises a controller for a component of a Heating, Ventilation, and Air Conditioning system or a thermostat adapted to control at least a portion of the Heating, Ventilation, and Air Conditioning system.

31. The apparatus of claim 27, wherein:
the apparatus further comprises a housing;
the circuitry is within the housing; and
the housing has terminals for wires connected to a controller for a portion of a Heating, Ventilation, and Air Conditioning system.

* * * * *